United States Patent
Burriesci et al.

(10) Patent No.: US 11,068,584 B2
(45) Date of Patent: Jul. 20, 2021

(54) SYSTEMS AND METHODS FOR DEPLOYING COUNTERMEASURES AGAINST UNAUTHORIZED SCRIPTS INTERFERING WITH THE RENDERING OF CONTENT ELEMENTS ON INFORMATION RESOURCES

(71) Applicant: Google LLC, Mountain View, CA (US)

(72) Inventors: Matthew Burriesci, Mountain View, CA (US); Rebecca Illowsky, Mountain View, CA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 16/062,022

(22) PCT Filed: May 27, 2016

(86) PCT No.: PCT/US2016/034600
§ 371 (c)(1),
(2) Date: Jun. 13, 2018

(87) PCT Pub. No.: WO2017/135984
PCT Pub. Date: Aug. 10, 2017

(65) Prior Publication Data
US 2019/0220591 A1 Jul. 18, 2019

Related U.S. Application Data

(60) Provisional application No. 62/289,699, filed on Feb. 1, 2016.

(51) Int. Cl.
*G06F 21/51* (2013.01)
*G06F 21/64* (2013.01)
(Continued)

(52) U.S. Cl.
CPC .......... *G06F 21/51* (2013.01); *G06F 16/9577* (2019.01); *G06F 21/128* (2013.01);
(Continued)

(58) Field of Classification Search
CPC ....... G06F 17/212; G06F 21/51; H04L 67/02; H04L 63/12; H04L 63/123
See application file for complete search history.

(56) References Cited

U.S. PATENT DOCUMENTS 6,271,840 B1   8/2001   Finseth et al.
7,788,577 B2 * 8/2010   Lueck ................ G06F 16/9577
                                            715/239

(Continued)

FOREIGN PATENT DOCUMENTS

EP      2 642 715      9/2013

OTHER PUBLICATIONS

International Preliminary Report on Patentability for PCT Appl. Ser. No. PCT/US2016/034600 dated Jan. 3, 2018 (18 pages).

(Continued)

*Primary Examiner* — James R Turchen
(74) *Attorney, Agent, or Firm* — Foley & Lardner LLP

(57) ABSTRACT

Systems and methods for deploying countermeasures against unauthorized scripts interfering with the rendering of content elements on information resources are provided herein. A computing device can receive an information resource including a content rendering verification script and a first content element. The computing device can execute the script. The computing device can render the first content element for display on the information resource in a first format. The computing device can determine that the first content element is not successfully displayed in the first format. The computing device can render the first content element for display on the information resource in a second
(Continued)

format, responsive to the determination. The computing device can determine that the first content element is successfully displayed in the second format. The computing device can display a second content element of the information resource responsive to the determination.

15 Claims, 10 Drawing Sheets

(51) Int. Cl.
    *H04L 29/06*        (2006.01)
    *G06F 16/957*     (2019.01)
    *G06F 21/12*      (2013.01)

(52) U.S. Cl.
    CPC .......... *G06F 21/645* (2013.01); *H04L 63/168* (2013.01); *G06F 2221/032* (2013.01); *G06F 2221/2119* (2013.01)

(56) References Cited

U.S. PATENT DOCUMENTS

| | | | | |
|---|---|---|---|---|
| 8,671,352 B1* | 3/2014 | Hsu | .......................... | G06T 11/60 715/762 |
| 8,677,481 B1* | 3/2014 | Lee | ..................... | H04L 63/1416 726/22 |
| 8,850,010 B1 | 9/2014 | Qureshi | | |
| 9,231,975 B2* | 1/2016 | Johns | ...................... | G06F 21/52 |
| 9,237,311 B2* | 1/2016 | Raftelis | .............. | H04N 7/17318 |
| 9,311,422 B2* | 4/2016 | Rumsey | ................ | G06F 16/958 |
| 9,407,658 B1* | 8/2016 | Kuskov | ............... | H04L 63/1425 |
| 9,575,941 B1* | 2/2017 | Westbrook | ............ | G06F 40/117 |
| 9,692,787 B1* | 6/2017 | Warner | ................... | H04L 63/20 |
| 9,697,190 B2* | 7/2017 | Baldwin | ............... | G06F 16/986 |
| 9,792,267 B2* | 10/2017 | Tupil | ...................... | G06F 40/14 |
| 9,811,509 B2* | 11/2017 | Gnech | ................... | G06F 40/143 |
| 10,007,647 B2* | 6/2018 | Falkenberg | ............. | G06F 40/14 |
| 10,078,626 B1* | 9/2018 | Voskamp | ............ | G06F 16/9577 |
| 10,241,978 B2* | 3/2019 | Levi | ...................... | G06F 40/197 |
| 10,303,526 B2* | 5/2019 | Urim | ..................... | G06F 3/1454 |
| 2003/0145197 A1* | 7/2003 | Lee | ........................ | G06F 21/64 713/155 |
| 2005/0114516 A1 | 5/2005 | Smith et al. | | |
| 2007/0256010 A1* | 11/2007 | Blackmon | ............. | G06F 40/226 |
| 2008/0027866 A1* | 1/2008 | Halcrow | ............. | G06F 21/6209 705/51 |
| 2008/0034404 A1* | 2/2008 | Pereira | ..................... | H04L 63/12 726/2 |
| 2008/0155392 A1* | 6/2008 | Coutts | ..................... | G06F 21/64 715/229 |
| 2008/0256439 A1* | 10/2008 | Boreham | .............. | G06F 40/103 715/246 |
| 2009/0216769 A1 | 8/2009 | Bellwood et al. | | |
| 2010/0185953 A1* | 7/2010 | Grandemenge | ......... | G06F 21/83 715/743 |
| 2012/0166933 A1* | 6/2012 | Cui | ....................... | G06F 40/226 715/234 |
| 2013/0061132 A1* | 3/2013 | Zheng | .................... | G06K 9/325 715/234 |
| 2013/0254655 A1* | 9/2013 | Nykyforov | ........... | G06F 40/103 715/244 |
| 2013/0263280 A1* | 10/2013 | Cote | ................... | H04L 63/1433 726/26 |
| 2014/0208197 A1* | 7/2014 | Ellis | ........................ | G06F 40/14 715/234 |
| 2014/0245115 A1* | 8/2014 | Zhang | ................ | G06F 3/04842 715/202 |
| 2015/0074516 A1* | 3/2015 | Ben-Aharon | ......... | G06F 40/151 715/234 |
| 2015/0128064 A1* | 5/2015 | Fleming | ................ | G06F 3/0484 715/744 |
| 2015/0278172 A1* | 10/2015 | Tupil | .................... | G06F 40/106 715/744 |
| 2016/0028743 A1* | 1/2016 | Johns | .................... | G06F 40/143 726/26 |
| 2016/0110082 A1* | 4/2016 | Zhang | ................... | G06F 16/972 715/765 |
| 2016/0364369 A1* | 12/2016 | Zhou | ....................... | G06F 40/14 |
| 2017/0017380 A1* | 1/2017 | Mehrotra | ............... | H04W 4/18 |

OTHER PUBLICATIONS

International Preliminary Report on Patentability for PCT Appl. Ser. No. PCT/US2016/034605 dated Apr. 25, 2018 (32 pages).
International Search Report and Written Opinion for PCT Appl. Ser. No. PCT/US2016/034600 dated Oct. 27, 2016 (13 pages).
International Search Report and Written Opinion for PCT Appl. Ser. No. PCT/US2016/034605 dated Oct. 7, 2016 (11 pages).
Johns, et al: "Tamper-Resistant LikeJacking Protection", SAP Security Research, Germany, Oct. 23, 2013, Correct System Design; [Lecture Notes in Computer Science; Lect.Notes Computer], Springer International Publishing, Cham, pp. 265-285, XP047043738.
Reis, et al., "Detecting In-Flight Page Changes with Web Tripwires", USENIX Association, NSDI '08: 5th USENIX Symposium on Networked Systems Design and Implementation, Apr. 5, 2008, pp. 31-44, XP061010688.
Office Action on CN Appln. Ser. No. 201680061924.0 dated Oct. 9, 2019 (16 pages).
Anonymous, "Writing AdBlock Plus Filters," dated Nov. 12, 2010 (2 pages).
Foreign Office Action on EP Appln. Ser. No. 16728803.4 dated Oct. 15, 2019 (8 pages).
Post, Elliott et al., "Comparative Study and Evaluation of Online Ad-Blockers," 2015 2nd International Conference on Information Science and Security, IEEE, dated Dec. 14, 2015 (4 pages).
Foreign Action other than Search Report on EP 16728803.4 dated Apr. 26, 2019 (6 pages).
Foreign Search Report on EP 19181490.4 dated Aug. 13, 2019 (6 pages).
Examination Report for EP Appln. Ser. No. 16728803.04 dated Mar. 13, 2020 (4 pages).
Non-Final Office Action for U.S. Appl. No. 16/062,015 dated Apr. 24, 2020 (8 pages).
Second Office Action for CN Appln. Ser. No. 201680001924.0 dated Mar. 31, 2020 (13 pages).
Decision of Rejection for CN Appln. Ser. No. 201680001924.0 dated Jul. 3, 2020 (6 pages).
First Office Action for CN Appln. Ser. No. 201680053721.6 dated Jul. 23, 2020 (13 pages).
Notice of Allowance for U.S. Appl. No. 16/062,015 dated Oct. 27, 2020 (6 pages).
Corrected Notice of Allowance for U.S. Appl. No. 16/062,015 dated Dec. 4, 2020 (2 pages).
"AdBlock Plus filters explained", AdBlock Plus, Jan. 29, 2016, retrieved Mar. 19, 2021 from URL: https://web.archive.org/web/20160129174040/https://adblockplus.org/filter-cheatsheet (7 pages).
"CSS Layout—the position Property", W3Schools, Jan. 29, 2016, retrieved Mar. 19, 2021 from URL: https://web.archive.org/web/20160129003053/http://www.w3schools.co m/css/css_positioning.asp (9 pages).
Examination Report for EP Appln. Ser. No. 21156963.7 dated Mar. 31, 2021 (9 pages).

* cited by examiner

SYSTEMS AND METHODS FOR DEPLOYING COUNTERMEASURES AGAINST UNAUTHORIZED SCRIPTS INTERFERING WITH THE RENDERING OF CONTENT ELEMENTS ON INFORMATION RESOURCES

RELATED APPLICATIONS

The present application is a National Stage Application under 35 U.S.C. § 371 of International Patent Application No. PCT/US2016/034600, titled "SYSTEMS AND METHODS FOR DEPLOYING COUNTERMEASURES AGAINST UNAUTHORIZED SCRIPTS INTERFERING WITH THE RENDERING OF CONTENT ELEMENTS ON INFORMATION RESOURCES" and filed May 27, 2016, which claims priority to U.S. Provisional Patent Application No. 62/289,699, titled "SYSTEMS AND METHODS FOR DEPLOYING COUNTERMEASURES AGAINST UNAUTHORIZED SCRIPTS INTERFERING WITH THE RENDERING OF CONTENT ELEMENTS ON INFORMATION RESOURCES" and filed on Feb. 1, 2016, the entire contents of each of which are hereby incorporated by reference for all purposes.

BACKGROUND

Computing devices execute applications that are configured to provide for display, content included in information resources (e.g., webpages). In some computing devices, the application may allow one or more scripts to execute. These scripts may interfere with the information resources and the application's ability to display the content included in the information resources.

SUMMARY

At least one aspect is directed to a method of deploying countermeasures against unauthorized scripts interfering with the rendering of content elements on information resources. The client device can receive, from a data processing system, an information resource including a content rendering verification script and a first content element. The script can include computer-executable instructions to cause the client device to render the first content element for display on the information resource in a first format. The script can include computer-executable instructions to cause the client device to determine that the first content element is not successfully displayed in the first format. The script can include computer-executable instructions to cause the client device to, responsive to determining that the first content element is not successfully displayed in the first format, render the first content element for display on the information resource in a second format. The script can include computer-executable instructions to cause the client device to determine that the first content element is successfully displayed in the second format. The script can include computer-executable instructions to cause the client device to display a second content element of the information resource responsive to determining that the first content element is successfully displayed in the second format.

In some implementations, rendering the first content element for display on the information resource can further include identifying a rendering tree for rendering the information resource. The rendering tree can include one or more nodes. In some implementations, determining that the first content element is not successfully displayed in the first format can further include determining that any of the one or more nodes of the rendering tree does not correspond to the first content element In some implementations, rendering the first content element for display on the information resource can further include identifying a rendering tree for rendering the information resource, the rendering tree including one or more nodes. In some implementations, determining that the first content element is not successfully displayed in the first format can further include determining that a second content element is displayed as an overlay over the first content element.

In some implementations, rendering the first content element for display on the information resource can further include identifying a document tree generated from the information resource. The document tree can include a plurality of content object. In some implementations, determining that the first content element is not successfully displayed in the first format can further include determining that at least one content object of the document tree is altered.

In some implementations, rendering the first content element for display on the information resource can further include identifying an object model generated based on the information resource. The object model can include a plurality of content object. Each content object can include a corresponding style rule. In some implementations, determining that the first content element is not successfully displayed in the first format can further include determining that at least one style rule of the object model is altered.

In some implementations, rendering the first content element for display on the information resource in the second format can further include modifying the first content element by including the second format, the second format specifying different visual characteristics for the first content element from the first format. In some implementations, receiving the information resource can further include receiving the information resource including the first content element, the first content element including a plurality of formats and a prioritization order specifying a selection sequence of the plurality of formats for processing by the client device. In some implementations, rendering the first content element for display on the information resource in the second format can further include selecting, from the plurality of formats included in the first content element, the second format subsequent to the first format based on the prioritization order.

In some implementations, the script can further cause the client device to maintain a counter indicating a number of attempts to display the first content element on the information resource. In some implementations, the script can further cause the client device to increment, responsive to determining that the first content element in the first format is not successfully displayed on the information resource, the counter indicating the number of attempts. In some implementations, the script can further cause the client device to determine that the counter indicating the number of attempts is below a predetermined threshold. In some implementations, rendering the first content element for display on the information resource in the second format can further include modifying the first content element using the second format, responsive to determining that the counter indicating the number of attempts is below the predetermined threshold.

In some implementations, determining that the first content element is successfully displayed in the second format can further include transmitting, responsive to determining that the first content element is successfully displayed in the second format, to the data processing system, a pingback. The pingback can indicate successful rendering of the first content element on the information resource. The pingback can include a device identifier of the client device and a format identifier of the second format. In some implementations, receipt of the pingback can cause the data processing system to update a database maintained by the data processing system based on the device identifier and the format identifier. In some implementations, the database can include a plurality of entries identifying for each device identifier a set of accepted format identifiers corresponding to formats successfully displayed.

In some implementations, the client device can transmit, to the data processing system, a request for content, the request including a device identifier and an application profile. In some implementations, receipt of the request can cause the data processing system to select the first content element including a plurality of formats. In some implementations, receipt of the request can cause the data processing system to calculate, for each of the plurality of formats, a likelihood of success that the first content element in the respective format will be displayed on the information resource based on the device identifier and the application profile. In some implementations, receipt of the request can cause the data processing system to determine a prioritization order specifying a selection sequence of the plurality of formats for processing by the client device based on the likelihood of success for each of the plurality of formats.

At least one aspect is directed to a system for deploying countermeasures against unauthorized scripts interfering with the rendering of content elements on information resources. The system can include a client device having one or more processors. The client device can receive, from a data processing system, an information resource including a content rendering verification script and a first content element. The script can include computer-executable instructions to cause the client device to render the first content element for display on the information resource in a first format. The script can include computer-executable instructions to cause the client device to determine that the first content element is not successfully displayed in the first format. The script can include computer-executable instructions to cause the client device to, responsive to determining that the first content element is not successfully displayed in the first format, render the first content element for display on the information resource in a second format. The script can include computer-executable instructions to cause the client device to determine that the first content element is successfully displayed in the second format. The script can include computer-executable instructions to cause the client device to display a second content element of the information resource responsive to determining that the first content element is successfully displayed in the second format.

In some implementations, the script can further cause the client device to identify a rendering tree for rendering the information resource. The rendering tree can include one or more nodes. In some implementations, the script can further cause the client device to determine that any of the one or more nodes of the rendering tree does not correspond to the first content element.

In some implementations, the script can further cause the client device to identify a rendering tree for rendering the information resource, the rendering tree including one or more nodes. In some implementations, the script can further cause the client device to determine that a second content element is displayed as an overlay over the first content element.

In some implementations, the script can further cause the client device to identify a document tree generated from the information resource, the document tree including a plurality of content object. In some implementations, the script can further cause the client device to identify, from the document tree, that none of the plurality of content objects corresponds to the first content element.

In some implementations, the script can further cause the client device to identify an object model generated based on the information resource. The object model can include a plurality of content object. Each content object can include a corresponding style rule. In some implementations, the script can further cause the client device to determine that at least one corresponding style rule of the object model is altered.

In some implementations, the script can further cause the client device to modify the first content element by including the second format. The second format can specify different visual characteristics for the first content element from the first format. In some implementations, the script can further cause the client device to receive the information resource including the first content element. The first content element can include a plurality of formats and a prioritization order specifying a selection sequence of the plurality of formats for processing by the client device. In this way, the script may be better able to ensure successful content delivery and/or improve security. In some implementations, the script can further cause the client device to select, from the plurality of formats included in the first content element, the second format subsequent to the first format based on the prioritization order.

In some implementations, the script can further cause the client device to maintain a counter indicating a number of attempts to display the first content element on the information resource. In some implementations, the script can further cause the client device to increment, responsive to determining that the first content element in the first format is not successfully displayed on the information resource, the counter indicating the number of attempts. In some implementations, the script can further cause the client device to determine that the counter indicating the number of attempts is below a predetermined threshold. In some implementations, rendering the first content element for display on the information resource in the second format can further include modifying the first content element using the second format, responsive to determining that the counter indicating the number of attempts is below the predetermined threshold.

In some implementations, the script can further cause the client device to transmit, responsive to determining that the first content element is successfully displayed in the second format, by the client device to the data processing system, a pingback. The pingback can indicate successful rendering of the first content element on the information resource. The pingback can include a device identifier of the client device and a format identifier of the second format. In some implementations, receipt of the pingback can cause the data processing system to update a database maintained by the data processing system based on the device identifier and the format identifier. The database can include a plurality of entries identifying for each device identifier a set of accepted format identifiers corresponding to formats successfully displayed. Such a database may facilitate improved future data delivery when providing further information resources to client devices.

In some implementations, the client device can transmit, to the data processing system, a request for content. The request can include a device identifier and an application profile. In some implementations, receipt of the request can cause the data processing system to calculate, for each of the plurality of formats, a likelihood of success that the first content element in the respective format will be displayed on the information resource based on the device identifier and the application profile. In some implementations, receipt of the request can cause the data processing system to determine a prioritization order specifying a selection sequence of the plurality of formats for processing by the client device based on the likelihood of success for each of the plurality of formats.

These and other aspects and implementations are discussed in detail below. The foregoing information and the following detailed description include illustrative examples of various aspects and implementations, and provide an overview or framework for understanding the nature and character of the claimed aspects and implementations. The drawings provide illustration and a further understanding of the various aspects and implementations, and are incorporated in and constitute a part of this specification.

BRIEF DESCRIPTION OF THE DRAWINGS

The accompanying drawings are not intended to be drawn to scale. Like reference numbers and designations in the various drawings indicate like elements. For purposes of clarity, not every component may be labeled in every drawing. In the drawings.

DETAILED DESCRIPTION

Figure 1:
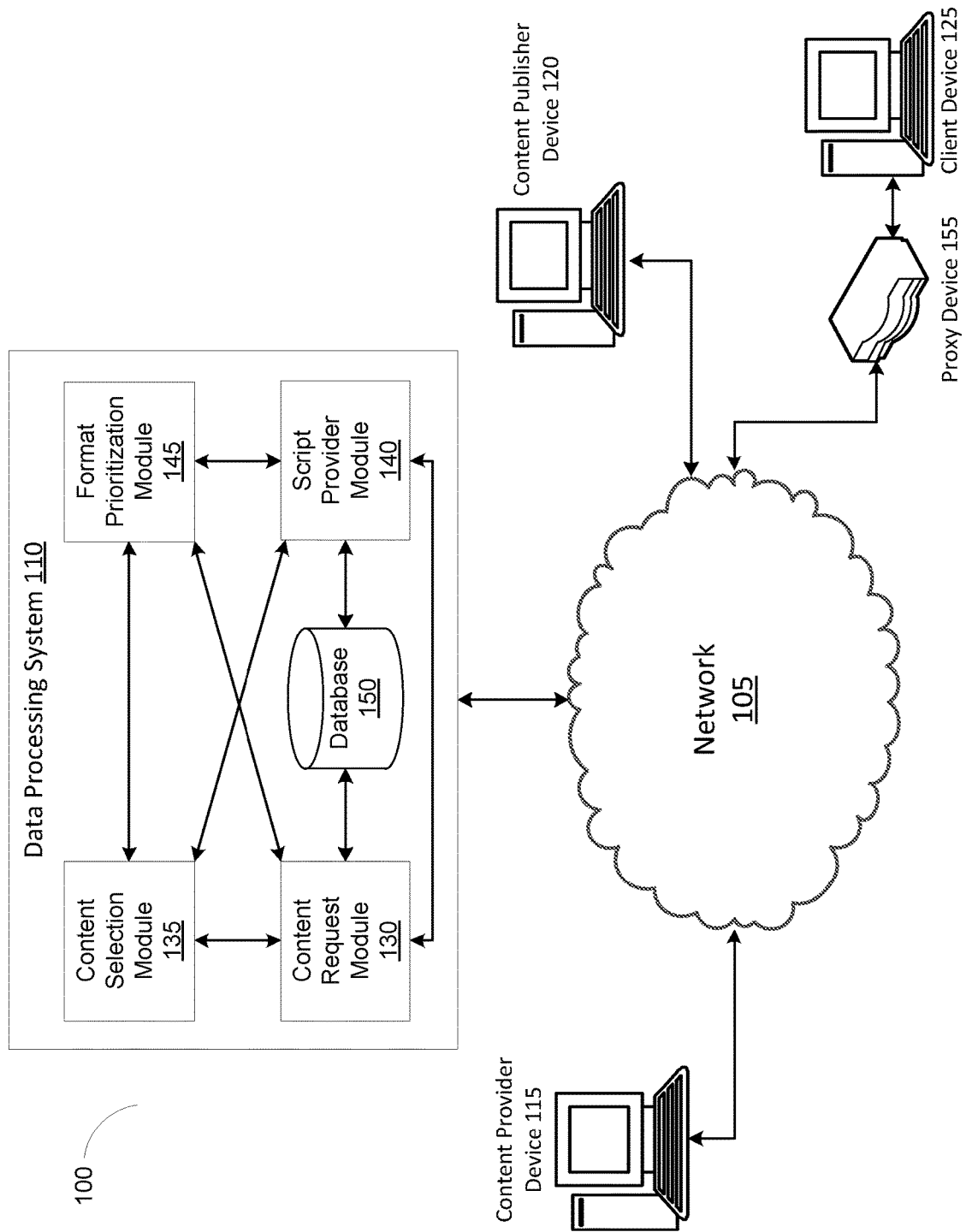
FIG. 1 is a block diagram depicting one implementation of an environment for deploying countermeasures against unauthorized scripts interfering with the rendering of content elements on information resources in a computer network environment, according to an illustrative implementation.

Following below are more detailed descriptions of various concepts related to, and implementations of, methods, apparatuses, and systems of deploying countermeasures against unauthorized scripts interfering with the rendering of content elements on information resources in a computer network environment. The various concepts introduced above and discussed in greater detail below may be implemented in any of numerous ways, as the described concepts are not limited to any particular manner of implementation.

Information resources (e.g., webpages) can include one or more content elements (e.g., inline frames, images, and sections, among others). Some of these content elements can define the visual content makeup of the information resource. An application (e.g., web browser) can use such content elements to process, render, and display the information resource on a display of a computing device. Content control modules (e.g., content filters, malware, or ad blockers) operating as a plug-in on the application or as an individual program separate from the application executing on the client device or a proxy device (e.g., router) can interfere with the rendering of the one or more content elements of the information resource. Some such content control modules can filter or block the rendering of some content elements by preventing the application responsible for displaying the information resource from retrieving content elements from servers that may be included in a list of servers maintained by the content control modules.

These content control modules may raise security issues. Such content control modules can change the constituent content elements initially served with the information resource without authorization. Furthermore, these modules can cause the behavior of the content elements and the information resources to deviate from how the information resource was originally programmed. For example, a content control module can change a link (e.g., hyperlink) in one of the content elements, potentially causing the client device to be redirected to a malicious website. Moreover, from a human-computer interaction (HCI) perspective, these changes to the content elements and deviations in behavior of the information resources may interfere with a user's experience with the information resource and the application. For instance, if the content control module removes one of the content elements from the information resource, the user is unable to view or interact with the removed content element, thereby decreasing the user's experience with the information resource as originally encoded.

In some implementations, content publishers can include instructions in information resources that can cause client devices to request content from one or more content servers via one or more links. These content servers may be different from host servers hosting content of the content publisher. By including instructions to request content instead of inserting content directly into the information resource prior to transmitting the information resource, content publishers can reduce the latency in serving information resources to client devices as well as reduce the amount of network traffic. Some content control modules executing on client devices can interfere in the client device's ability to transmit the requests for content from the one or more content servers by either modifying the links to the content servers to other unauthorized or unknown content servers or by simply preventing any request to be transmitted to any content server. As a result, the client device is unable to access or display all of the content items the content publisher desired to include in the information resource of the content publisher.

To mitigate some of the potential harms of the content control modules, content publishers may include instructions to cause the client device to request content from the host server hosting the information resource instead of one or more other content servers. This implementation, however, may not be able to counteract against other techniques that content control modules may employ. For example, a content control module may be able to run visual-based techniques such as identifying differences in color among the content elements to block content elements of the information resource.

To address these and other challenges, the present disclosure provides systems and methods for deploying countermeasures against unauthorized scripts interfering with the rendering of content elements on information resources. In one implementation, a client device can receive an information resource including content elements and a content render verification script from a data processing system. Each of the content elements can include formats defining various visual characteristics for the content element. Executing the content rendering verification script, the client device can attempt to process a content element in one format for rendering. The client device can verify whether the application of the client device has properly generated the document tree, object model, rendering tree, and the layout for the information resource. If the document tree, object model, rendering tree, or the layout differs from the specifications of the information resource, the client device can repeat this process, select another format for the content element, and verify whether the application of the client device has properly generated the document tree, object model, rendering tree, and the layout for the information resource. The client device can repeat this process until the content element is properly processed the information resource. The client device can send back a pingback to the data processing system indicating whether the content element of the information resource was properly rendered on the client device.

In some implementations, a second content element of the information resources may be prevented from being displayed until it has been determined that the first content element has been successfully displayed. When the content control module is interfering with the successful delivery of a content element, the display of further content elements may be prevented. In such implementations, it may be determined that a content element (e.g., the first content element or a further content element) is unable to be displayed even after attempting to render the content element a plurality of formats. Withholding content elements in this manner may prevent further unauthorized, and potentially insecure, interference, and may alert the user of the client device to the operation of the unauthorized script.

FIG. 1 is a block diagram depicting one implementation of an environment for deploying countermeasures against unauthorized scripts interfering with the rendering of content elements on information resources in a computer network environment. The environment 100 includes at least one data processing system 110. The data processing system 110 can include at least one processor and a memory, i.e., a processing circuit. The memory stores processor-executable instructions that, when executed by processor, cause the processor to perform one or more of the operations described herein. The processor may include a microprocessor, application-specific integrated circuit (ASIC), field-programmable gate array (FPGA), etc., or combinations thereof. The memory may include, but is not limited to, electronic, optical, magnetic, or any other storage or transmission device capable of providing the processor with program instructions. The memory may further include a floppy disk, CD-ROM, DVD, magnetic disk, memory chip, ASIC, FPGA, read-only memory (ROM), random-access memory (RAM), electrically-erasable ROM (EEPROM), erasable-programmable ROM (EPROM), flash memory, optical media, or any other suitable memory from which the processor can read instructions. The instructions may include code from any suitable computer-programming language. The data processing system can include one or more computing devices or servers that can perform various functions. In some implementations, the data processing system can include an advertising auction system configured to host auctions. In some implementations, the data processing system does not include the advertising auction system but is configured to communicate with the advertising auction system via the network 105.

The network 105 can include computer networks such as the internet, local, wide, metro or other area networks, intranets, satellite networks, other computer networks such as voice or data mobile phone communication networks, and combinations thereof. The data processing system 110 of the system 100 can communicate via the network 105, for instance with at least one content provider computing device 115, at least one content publisher computing device 120, or at least one client device 125. The network 105 may be any form of computer network that relays information between the client device 125, data processing system 110, and one or more content sources, for example, web servers, advertising servers, amongst others. For example, the network 105 may include the Internet and/or other types of data networks, such as a local area network (LAN), a wide area network (WAN), a cellular network, satellite network, or other types of data networks. The network 105 may also include any number of computing devices (e.g., computer, servers, routers, network switches, etc.) that are configured to receive and/or transmit data within network 105. The network 105 may further include any number of hardwired and/or wireless connections. For example, the client device 125 may communicate wirelessly (e.g., via WiFi, cellular, radio, etc.) with a transceiver that is hardwired (e.g., via a fiber optic cable, a CAT5 cable, etc.) to other computing devices in network 105. The client device 125 may also communicate wireless with the computing devices of the network 105 via a proxy device 155 (e.g., router, network switch, or gateway).

The content provider computing devices 115 can include servers or other computing devices operated by a content provider entity to provide content elements to the content publisher computing devices 120 or the data processing system 110. The content provided by the content provider computing device 115 can include third party content elements for display on information resources, such as a website or web page that includes primary content, e.g. content provided by the content publisher computing device 120. The content elements can also be displayed on a search results web page. The content elements associated with the content provider computing device 115 can be displayed on information resources other than web pages, such as content displayed as part of the execution of an application on a smartphone or other client device 125. The content publisher computing devices 120 or the data processing system 110 in turn can select the content elements of the content provider computing devices 115. For example, the data processing system 110 can run an ad auction to select the content elements based on various performance metrics of the respective content elements. The content publisher computing devices 120 or the data processing system can transmit the selected content elements of the content provider computing devices for display on information resources at the client devices 125.

The content publisher computing devices 120 can include servers or other computing devices operated by a content publishing entity to provide primary content for display via the network 105. For instance, the content publisher computing device 120 can include a web page operator who provides primary content for display on the web page. The content publisher computing devices 120 can also provide third party content received from the content provider computing devices 115 for display via the network 105. The primary content can include content other than that provided by the content publisher computing device 120, and the web page can include content slots configured for the display of content elements received by the content publisher computing devices 120 from the content provider computing devices 115. For instance, the content publisher computing device 120 can operate the website of a company and can provide content about that company for display on web pages of the website. The web pages can include content slots configured for the display of content elements such as images, text, videos, or any combination thereof received from the content provider computing device 115. In some implementations, the content publisher computing device 120 includes a search engine computing device (e.g. server) of a search engine operator that operates a search engine website. The primary content of search engine web pages (e.g., a results or landing web page) can include results of a search as well as third party content elements displayed in content slots such as content elements from the content provider computing device 115. In some implementations, the content publisher computing device 120 can include a server for serving video content.

In some implementations, the content publisher computing devices 120 can select one or more content elements received from the content publisher computing devices 120 to include in an information resource with the primary content for display via the network 105. The content publisher computing devices 120 can transmit to client devices 125 content elements received from the content publisher computing devices 115 along with the primary content, responsive to a request for content from the client devices 125. In some implementations, subsequent to transmitting the primary content, the content publisher computing devices 120 can transmit to the client devices 125 content elements received from the content publisher computing devices 115, responsive to a request for additional content from the client devices 125. For example, the content publisher computing device 120 can receive an initial request for primary content from a client device 125 and in response transmit an information resource including primary content to the client device. Subsequent to the client device 125 detecting a dynamic event (e.g., change in scroll length of a webpage), the content publisher computing device 120 can receive a request for additional content and in turn provide content elements cached at the content publisher computing device 120 and received from the content provider computing devices 115.

The client devices 125 can include computing devices configured to communicate via the network 105 or via the network 105 through the proxy device 150 to display data such as the content provided by the content publisher computing device 120 (e.g., primary web page content or other information resources) and the content provided by the content provider computing device 115 (e.g., content elements configured for display in an information resource). The client device 125, the content provider computing device 115, and the content publisher computing device 120 can include desktop computers, laptop computers, tablet computers, smartphones, personal digital assistants, mobile devices, consumer computing devices, servers, clients, digital video recorders, a set-top box for a television, a video game console, or any other computing device configured to communicate via the network 105. The client device 125 can be communication devices through which an end user can submit requests to receive content. The requests can be requests to a search engine and the requests can include search queries. In some implementations, the requests can include a request to access a web page.

The proxy device 155 can include computing devices deployed between the client device 125 and the network 105. The proxy device 155 can be configured to communicate with one or more other computing devices, such as the data processing system 110, content provider devices 115, and content publisher devices 125 via the network 105. The proxy device 155 can be, for example, a router, network switch, gateway, network node, or any other computing device configured to receive and forward data packets from the client device 125 to the network 105 or from the network 105 to the client device 125.

The content provider computing devices 115, the content publisher computing device 120 and the client device 125 can include a processor and a memory, i.e., a processing circuit. The memory stores machine instructions that, when executed by processor, cause processor to perform one or more of the operations described herein. The processor may include a microprocessor, application-specific integrated circuit (ASIC), field-programmable gate array (FPGA), etc., or combinations thereof. The memory may include, but is not limited to, electronic, optical, magnetic, or any other storage or transmission device capable of providing the processor with program instructions. The memory may further include a floppy disk, CD-ROM, DVD, magnetic disk, memory chip, ASIC, FPGA, read-only memory (ROM), random-access memory (RAM), electrically-erasable ROM (EEPROM), erasable-programmable ROM (EPROM), flash memory, optical media, or any other suitable memory from which the processor can read instructions. The instructions may include code from any suitable computer-programming language.

The content provider computing devices 115, the content publisher computing devices 120, and the client device 125 may also include one or more user interface devices. In general, a user interface device refers to any electronic device that conveys data to a user by generating sensory information (e.g., a visualization on a display, one or more sounds, etc.) and/or converts received sensory information from a user into electronic signals (e.g., a keyboard, a mouse, a pointing device, a touch screen display, a microphone, etc.). The one or more user interface devices may be internal to a housing of the content provider computing devices 115, the content publisher computing device 120 and the client device 125 (e.g., a built-in display, microphone, etc.) or external to the housing of content provider computing devices 115, the content publisher computing device 120 and the client device 125 (e.g., a monitor connected to the client device 115, a speaker connected to the client device 115, etc.), according to various implementations. For example, the content provider computing devices 115, the content publisher computing device 120 and the client device 125 may include an electronic display, which visually displays web pages using webpage data received from one or more content sources and/or from the data processing system 110 via the network 105.

The data processing system 110 can include at least one server. For instance, the data processing system 110 can include a plurality of servers located in at least one data center or server farm. In some implementations, the data processing system 110 includes a content placement system, e.g., an ad server or ad placement system. The data processing system 110 can include at least one content request module 130, at least one content selection module 135, at least one script provider module 140, at least one format prioritization module 145, and at least one database 150. The content request module 130, the content selection module 135, the script provider module 140, and the format prioritization module 140 each can include at least one processing unit, server, virtual server, circuit, engine, agent, appliance, or other logic device such as programmable logic arrays configured to communicate with the database 150 and with other computing devices (e.g., the content provider computing device 115, the content publisher computing device 120, or the client device 125) via the network 105.

The content request module 130, the content selection module 135, the script provider module 140, and the format prioritization module 145 can include or execute at least one computer program or at least one script. The content request module 130, the content selection module 135, the script provider module 140, and the format prioritization module 145 can be separate components, a single component, or part of the data processing system 110. The content request module 130, the content selection module 135, and the script provider module 140, and the format prioritization module 145 can include combinations of software and hardware, such as one or more processors configured to execute one or more scripts.

The data processing system 110 can also include one or more content repositories or databases 150. The databases 150 can be local to the data processing system 110. In some implementations, the databases 150 can be remote to the data processing system 110 but can communicate with the data processing system 110 via the network 105. The databases 150 can include web pages, content elements (e.g., advertisements), and content render verification script, among others, to serve to a client device 125. In some implementations, information resources and content elements of the information resources can include those illustratively depicted in FIG. 2B. Additional details of the contents of the database 150 will be provided below.

The content request module 130 can receive a request for content from the client device 125. The request for content can include a request for an information resource or a request for content element for the information resource. The request for content can include a device identifier corresponding to the client device 125. The request for content can include an application profile identifying an application executing on the client device 125. The request for content can include an identifier for the information resource or the content element. For example, the request for content can include Uniform Resource Locator (URL) referring to a specific resource such as a webpage (e.g., "www.example.com/homepage.html"). The host name of the URL for the information resource may differ from the host name of the URL for the content element. For example, the URL for the information resource can be "www.example_publisher.com/index.html" but the URL for the content element can be "www.example_thirdparty.com/content_item_271828.html." The URL for a request for a content element can include a host page same as the URL for the information resource. For example, the URL for the information resource can be "www.example.com/index.html" but the URL for the content element can be "www.example.com/content_item_978.html."

In some implementations, the request for content can include an indicator indicating a request for a content render verification script. For example, the request for the information resource can include a header including an indicator specifying the script provider module 135 or the content publisher computing device 120 to send the content render verification script along with the information resource to the client device 125. In some implementations, the information resource can include the content render verification script inserted in the script or markup for the information resource. In some implementations, the information resource can include a script for retrieving the content render verification script for later insertion into the information resource.

The content selection module 135 or the content publisher computing device 120 can determine the content to transmit to the client device 125. The content selection module 135 or the content publisher computing device 120 can identify the address or identifier for the information resource and the content element included in the request for content. The content selection module 135 can access the database 150 and select the information resource or the content element identified by the address or identifier. The content selection module 135 can transmit a request to the content provider 115 or the content publisher 120 to access, retrieve, or otherwise receive the information resource or content element identified by the address or identifier. The content selection module 135 can transmit or forward the information resource or content element identified by the address or identifier to the client device 125. For example, the data processing system 110 can receive from a client device 125 a request for an information resource or the content element. The request may include an address referring to one of the content publishers 120. In this example, the content selection module 135 can forward the request for the information resource to the respective content publisher 120. Upon receiving the information resource from the respective content publisher 120, the content selection module 135 can forward the content document to the client device 125 that made the original request, along with the content render verification script.

In some implementations, the content selection module 135 can receive the content element from an ad auction system that can select the content element for display based on an ad auction. The ad auction system can select an ad from a plurality of ads based on ad auction parameters, such as bid values, size of ad, click-through rate (CTR), cost per mille (CPM), and impression rate, among others. The ad auction system can select the ad from the plurality of ads further based on size specifications of the respective ad and ad performance from previous presentation of the respective ad.

The script provider module 140 can receive a request for the content render verification script from the content publisher computing device 120 or the content provider computing device 115 for insertion into an information resource or content element to be provided to the client device 125. The script provider module 140 can, responsive to receiving the request for the content render verification script from the content publisher computing device 120 or the content provider computing device 115, transmit the content render verification script to the content publisher computing device 120 or the content provider computing device 115 for inclusion, insertion, embedding, or appending the content render verification script into the information resource or the content element. In some implementations, the script provider module 140 can transmit the information resource or the content element including the content render verification script to the client device 125, responsive to the request for the content render verification script from the content publisher computing device 120 or the content provider computing device 115. In some implementations, the script provider module 140 can receive a request for the content render verification script from the client device 125 along with a request for content. The script provider module 140 can transmit the content render verification script to the client device 125. In some implementations, the script provider module 140 can include, insert, embed, or otherwise append the content render verification script into the information resource or the content element to be transmitted to the client device 125. In some implementations, the script provider module 140, in conjunction with the other modules of the data processing system 110, can transmit the information resource or the content element with the content render verification script embedded to the client device 125.

In some implementations, the script provider module 140 can receive a request for an up-to-date version of the content render verification script from the content publisher computing device 120 or the content provider computing device 115. For example, the script provider module 140 can periodically receive a request for the content render verification script from the content publisher computing device 120 or the content provider computing device 115, and in response transmit the most up-to-date version of the content render verification script. In turn, the content publisher computing device 120 or the content provider computing device 115 can insert or otherwise embed the updated content render verification script into one or more information resources. In this example, when the content publisher computing device 120 or the content provider computing device 115 receives a request for an information resource from the client device 125, the content publisher computing device 120 or the content provider computing device 115 transmit the respective information resource or content element along with the content render verification script to the client device 125.

The format prioritization module 145 can identify the device identifier or the application profile included in the request for content received from the client device 125. The format prioritization module 145 can determine a type of application programming interface (API) or protocol based on the device identifier or the application identifier for the client device 125. The format prioritization module 145 can identify, select, or otherwise specify functional components to include into the content render verification script based on the identifier API or protocol. For example, when the request for content is received, the format prioritization module 145 can identify that the application running on the client device 125 used to process and execute an information resource is a particular type of web browser from the application profile. In this example, using the identified type of web browser, the format prioritization module 145 can select a script operable on the particular type of web browser to include into the content render verification script to access document trees, object models, rendering trees, and layouts generated by the application.

In some implementations, the format prioritization module 145 can select a plurality of formats for each content element on an information resource based on the identified device identifier or the application profile from the request for content. The format prioritization module 145 can determine a prioritization order specifying a selection sequence of the plurality of formats for processing by a computing device. The format prioritization module 145 can include, insert, embed, or otherwise append the prioritization order and the plurality of formats in the information resource to be sent to the client device 125. In some implementations, the prioritization module 145 can maintain the prioritization order in the database 150. The prioritization module 145 can update the database 150 and the prioritization order, responsive to receiving pingbacks from the client device 125 indicating the success or failure of rendering the plurality of formats for the one or more content elements of the information resource by the client device 125. In some implementations, the prioritization module 145 can update the database 150 and the prioritization order, responsive to not receiving any pingbacks from the client device 125 indicating failure of rendering of the plurality of formats for the one or more content elements of the information resource by the client device 125. The functionality of the format prioritization script 145 will be discussed below in conjunction with FIG. 2A.

In some implementations, the format prioritization module 145 can search the database 150 to identify one or more formats corresponding to content successfully rendered on the client device 125. In some implementations, the format prioritization module 145 can search the database 150 to identify one or more other formats corresponding to content prevented from rendering on the client device 125. In some implementations, the format prioritization module 145 can select one or more formats from the plurality of formats identified as successfully rendered or prevented from rendering on the client device 125. In some implementations, the format prioritization module 145 can use a list of formats to identify the one or more formats corresponding to content successfully rendered or the one or more other formats corresponding to content prevented from rendering on the client device 125. The database 150 can include the list of formats with an indication of success or failure of rendering the content element with the respective format by the client device 125. For each format, the list of formats may include a number of client devices 125 for which the format was successfully rendered or prevented from rendering. For each format, the list of formats may include a number of the client devices 125 by application profiles for which the format was successfully rendered or prevented from rendering.

In some implementations, the format prioritization module 145 can generate the prioritization order based on the list of formats. In some implementations, the format prioritization module 145 can identify the indication of success or failure of rendering the content element with the respective format by the client device 125. In some implementations, the format prioritization module 145 can identify the indication of success or failure of rendering the content element with the respective format by the particular client device 125 using the device identifier. In some implementations, the format prioritization module 145 can generate the prioritization order using each of the identified formats corresponding to the indication of success of rendering the content element with the respective format by the client device 125. For example, the format prioritization module 145 can identify all the formats identified as successfully rendered on the client device 125. The format prioritization module 145 can randomly set the order of formats to be rendered in the prioritization order using a pseudo-random number generator.

In some implementations, the format prioritization module 145 can identify, from the list of formats, a number of successful renderings by the client devices 125. In some implementations, the format prioritization module 145 can compare the number of successful renderings at the client device 125 to a threshold number. The threshold number may be predefined or preset. The threshold number may be based on a percentage of total number of transmissions to a plurality of client devices 125. For example, if there were over a 100,000 transmission of the respective format to a plurality of client devices 125, the format prioritization module 145 can set 25,000 (100,000×25%) as the threshold number. In some implementations, the format prioritization module 145 can select the one or more formats for which the number of successful renderings at the client device 125 is greater than or equal to the threshold number.

In some implementations, the format prioritization module 145 can identify, from the list of formats, a number of successful renderings by the client device 125 by the application profiles. The client devices 125 corresponding to one application profile may have a different number of successful renderings from other client devices 125 corresponding to another application profile. In some implementations, the format prioritization module 145 can identify, from the list of formats, the number of successful renderings by the client devices 125 with the same application profile as the client device 125 requesting content. In some implementations, the same application profile may correspond to a later, same, or earlier version of the application used to render the content elements with the format (e.g., web browser). In some implementations, the format prioritization module 145 can compare the number of successful renderings by the application profiles with a threshold number. The threshold number may be predefined or preset. The threshold number may be based on a percentage of total number of transmissions to a plurality of client devices 125 with the same application profile as the client device 125 requesting content. In some implementations, the format prioritization module 145 can select the one or more formats for which the number of successful renderings by the same application profile as the client device 125 is greater than or equal to the threshold number.

The content render verification script can include computer-executable instructions. The computer-executable instructions can include a script, such as HyperText Markup Language (HTML), Extensible HyperText Markup Language (XHTML), Extensible Markup Language (XML), Cascading Style Sheets (CSS), and JAVASCRIPT, among others. The computer-executable instructions can be executed by an application of the client device 125, for example, the application that caused the client device to transmit the request for content received by the content request module 130. The application can include, for example, an Internet browser, mobile application, or any other computer program capable of reading and executing the computer-executable instructions. In brief overview, the computer-executable instructions, when executed by one or more processors of the client device 125, can cause an application running on one or more processors of the client device to: (1) render the first content element for display on the information resource in a first format; (2) determine that the first content element is not successfully displayed in the first format; (3) responsive to determining that the first content element is not successfully displayed in the first format, render the first content element for display on the information resource in a second format; (4) determine that the first content element is successfully displayed in the second format; and (5) display a second content element of the information resource responsive to determining that the first content element is successfully displayed in the second format. The computer-executable instructions may therefore ensure that the first content element is displayed and has not been replaced or occluded by a content control module. User security and/or experience may therefore be improved by the execution of the computer-executable instructions. Additional details relating to the functions of the content render verification script are provided herein with respect to FIGS. 2A, 2B, and 3A-3C.

Figure 2A:
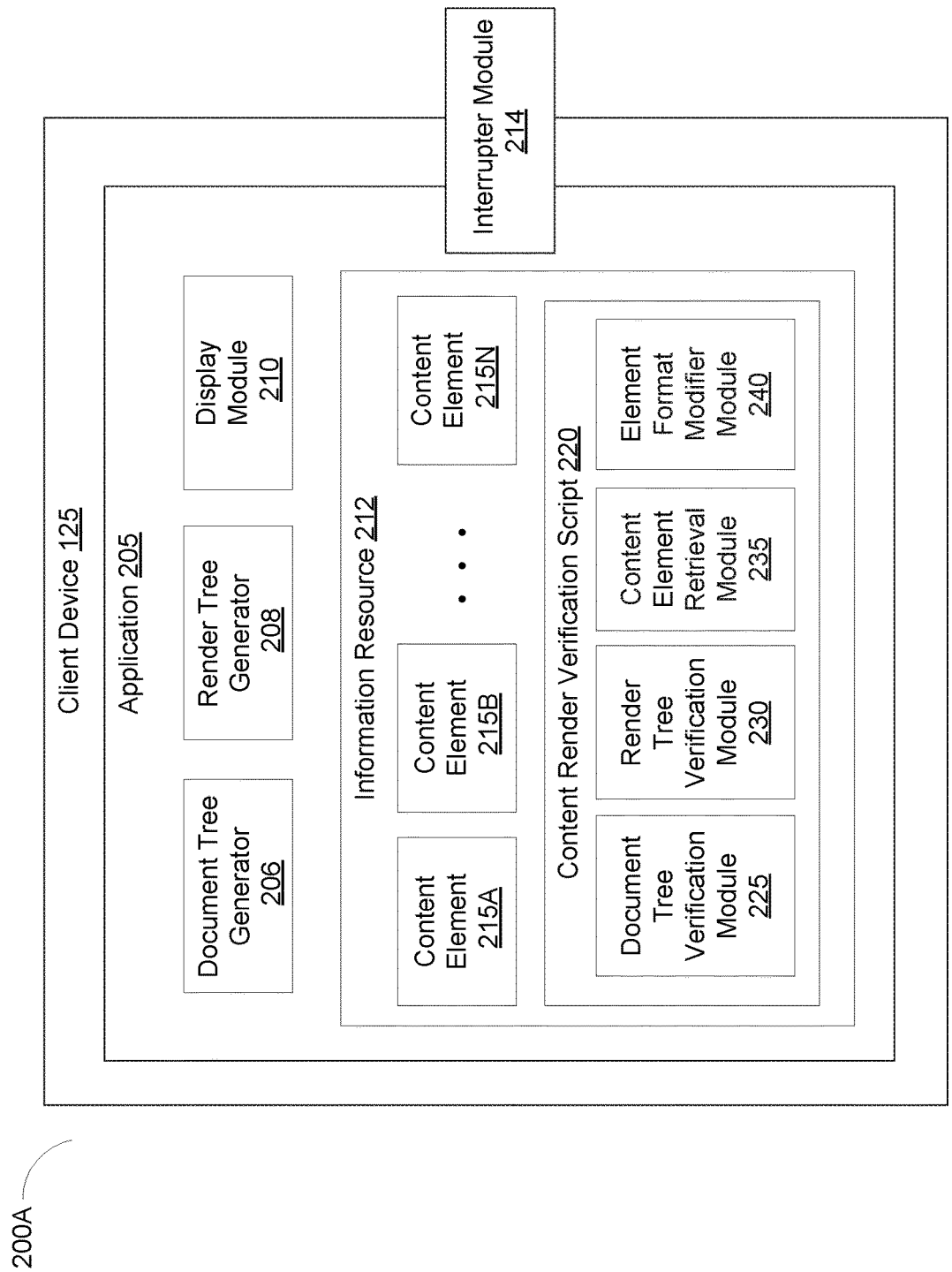
FIG. 2A is a block diagram depicting one implementation of a computing device including a content render verification system, according to an illustrative implementation.

Referring to FIG. 2A, FIG. 2A is a block diagram depicting one implementation of a computing device (e.g., client device 125) in a content render verification system 200A, according to an illustrative implementation. In brief overview, the content render verification system 200A can include a client device 125, an application 205 (e.g., web browser), an information resource 212 (e.g., web page), and an interrupter module 214 (e.g., ad blocker and malware). The application 205 can include, for example, an Internet browser, mobile application, or any other computer program capable of executing or otherwise invoking computer-executable instructions processed by the client device 125, such as the computer-executable instructions included in the information resource 212, one or more content elements 215A-N, or the content render verification script 220. The application 205 can include a document tree generator 206, rendering tree generator 208, and display module 210. The information resource 212 can include one or more content elements 215A-N and a content render verification script 220. The content render verification script 220 can include a document tree verification module 225, a rendering tree verification module 230, a content element retrieval module 235, and an element format modifier module 240. The interrupter module 214 can be a script or computer program on the application 205 (e.g., plug-in for a web browser), another application, computer program, or process running on the client device 125, or an application, computer program, or process running on another device such as the proxy device 155.

Figure 2B:
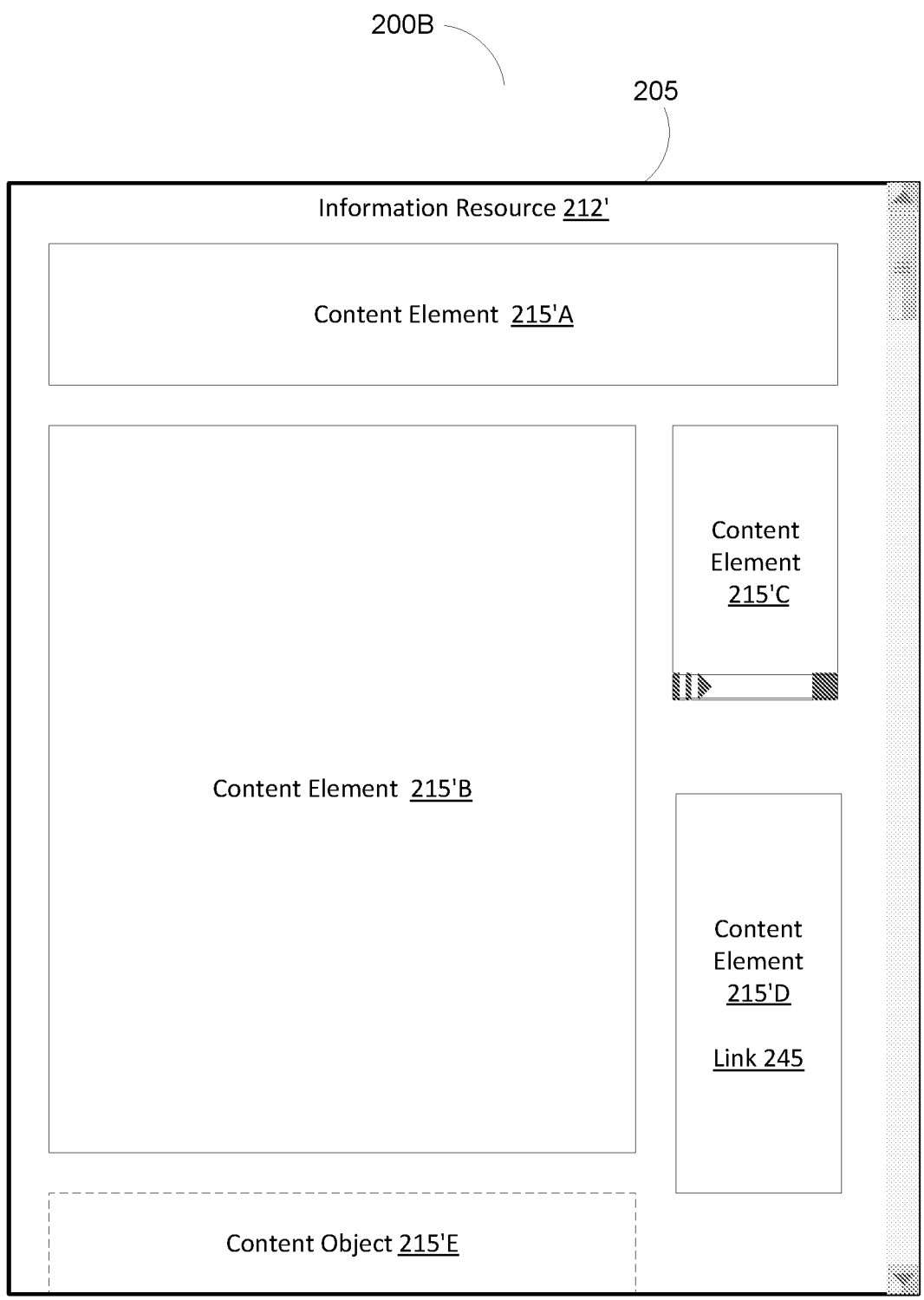
FIG. 2B is a block diagram depicting an information resource showing content elements of the information resource on an application, according to an illustrative implementation.

Referring to FIG. 2B, FIG. 2B is a block diagram depicting an information resource 212 showing content elements 215A-N on the application 205 displayed on the client device 125, according to an illustrative implementation. In brief overview, the example in FIG. 2B depicts a visual representation 200B of the information resource 212 processed and rendered by the application 205 and displayed on the client device 125. In this example, the displayed information resource 212' can include four displayed content elements 215'A-215'D each corresponding to the respective content element 215A-D of the information resource 212. The first displayed content element 215'A can be, for example, a banner ad slot located generally across the top of the displayed information resource 212'. The second displayed content element 215'B can be, for example, a body text located generally in the middle of the displayed information resource 212'. The third displayed content element 215'C can be, for example, an inline frame including a video element toward the top right of the displayed information resource 212'. The fourth displayed content element 215'D can be, for example, an image including a link 245 generally located toward the bottom right of the displayed information resource 212'. The information resource 212 can include a fifth content element 215E not yet rendered by the application 205 or displayed (as depicted by content object 215'E) on the information resource 212'.

In the context of FIG. 2B, the interrupter module 214 can change, modify, or remove one or more of the content elements 215A-N of the information resource 212 based on various attributes associated with the content element 215A-N. In some implementations, the interrupter module 214 can change, modify, or remove the one or more content elements 215A-N of the information resource 212 arbitrarily or randomly. This may result in the respective alteration of the display content element 215'A-D on the displayed information resource 212'. The interrupter module 214 can identify a type of content for each of the content elements 215A-N of the information resource 212 and apply a content alteration policy to change, modify, or remove the respective content element 215A-N based on the identified type of content. For example, the interrupter module 214 can identify that the first content element 215A is an ad slot based on the position and size specified in a detection algorithm, and can remove the code corresponding to the content element 215A from the information resource 212. In this example, this removal may result in the corresponding displayed content element 215'A removal from display on the displayed information resource 212'. In addition, the interrupter module 214 can identify that the type of content for the third content element 215C is a video content element and change the source of the video content to another, thereby resulting in another video being played on the displayed content element 215'C. Furthermore, the interrupter module 214 can identify that the fourth content element 215D includes a link 245 and either alter the destination link page or remove the link from the fourth content element 215D. In general, the interrupter module 214 can use any attribute associated with the content element 215A-N to change, modify, or remove one or more of the content elements 215A-N of the information resource 212, thereby causing the alteration of behavior of the displayed information resource 212'. The content render verification script 220 can determine that at least one of one or more content elements 215A-N is not successfully displayed and modify the respective content element 215A-N to prevent alteration of the content element 215A-N by the interrupter module 214.

Referring again to FIG. 2A, in further detail, the information resource 212 and the one or more content elements 215A-N of the information resource 212 can be received via the network 105 from the data processing system 110, the content publisher computing device 115, or the content provider computing device 120. In some implementations, the information resource 212 and the one or more content elements 215A-N can be from the same source (e.g., the data processing system 110). In some implementation, the same source may be identified by a similar identifier. For example, the information resource 212 may correspond to the URL "www.example.com/index.html" whereas one of the content elements 215A-N correspond to "www.example.com/q31.html." In this example, the host names in the URL for the information resource 212 and the content element 215A-N is the same. In some implementations, the information resource 212 and the one or more content elements 215A-N can be from the different sources identified by different identifiers. For example, the information resource 212 may correspond to the URL "www.example.com/home.html" whereas one of the content elements 215A-N may correspond to the URL "www.example2.com/ci_n31.img."

The information resource 212 can include script, markup, or otherwise code processed by the application 205 and executed by the one or more processors of the client device 125. For example, the information resource 212 can include HyperText Markup Language (HTML), Extensible HyperText Markup Language (XHTML), Extensible Markup Language (XML), Cascading Style Sheets (CSS), and JAVASCRIPT, or any combination thereof. The information resource 212 can include one or more content elements 215A-N, one or more corresponding style rules, and the content render verification script 220. Each of the one or more content elements 215A-N can correspond to a segment of the code of the information resource 212. In some implementations, each of the content elements 215A-N can include an HTML element. An HTML element can include, for example, a heading, body, paragraph, division, section, inline frame, image, canvas, applet, script, audio, video, table, and list, among others. Each of the content elements 215A-N can include one or more formats. Each of the one or more formats of each of the content elements 215A-N can include a corresponding attribute. Examples of attributes for content elements 215A-N may include color, font, font size, font type, size, and position, among others. Each of the one more style rules (e.g., CSS style rules) can specify one or more visual properties of the characteristic of the corresponding format of the respective the content element 215A-N. For example, the CSS style rule of the first format for the content element 215A can specify that any text of the first content element 215A is to be aligned to the center (e.g., "text-align: center"). In this example, the CSS style rule of the second format of the content element 215A can specify that any text of the first content element 215A is to be aligned to the right (e.g., "text-align: right"). The content render verification script 220 can correspond to one of the script portions of the information resource 212.

The document tree verification module 225 or the rendering tree verification module 230 can cause the application 205 to render one of the content elements 215A-N to render in one format. In some implementations, the document tree generator 206 can process each of the one or more content elements 215A-N of the information resource 212 to generate a document tree. For example, the document tree generator 206 can parse the HTML markup of the information resource 212 to generate a Document Object Model (DOM) tree. The document tree can include one or more content objects associated with each other in a hierarchical manner. For example, two content objects in the DOM tree can have a parent-child relationship in a tree data structure. Each of the content objects can correspond to one format for one of the one or more content elements 215A-N. Each of the content objects in the document tree can include one or more properties or attributes.

Figure 3A:
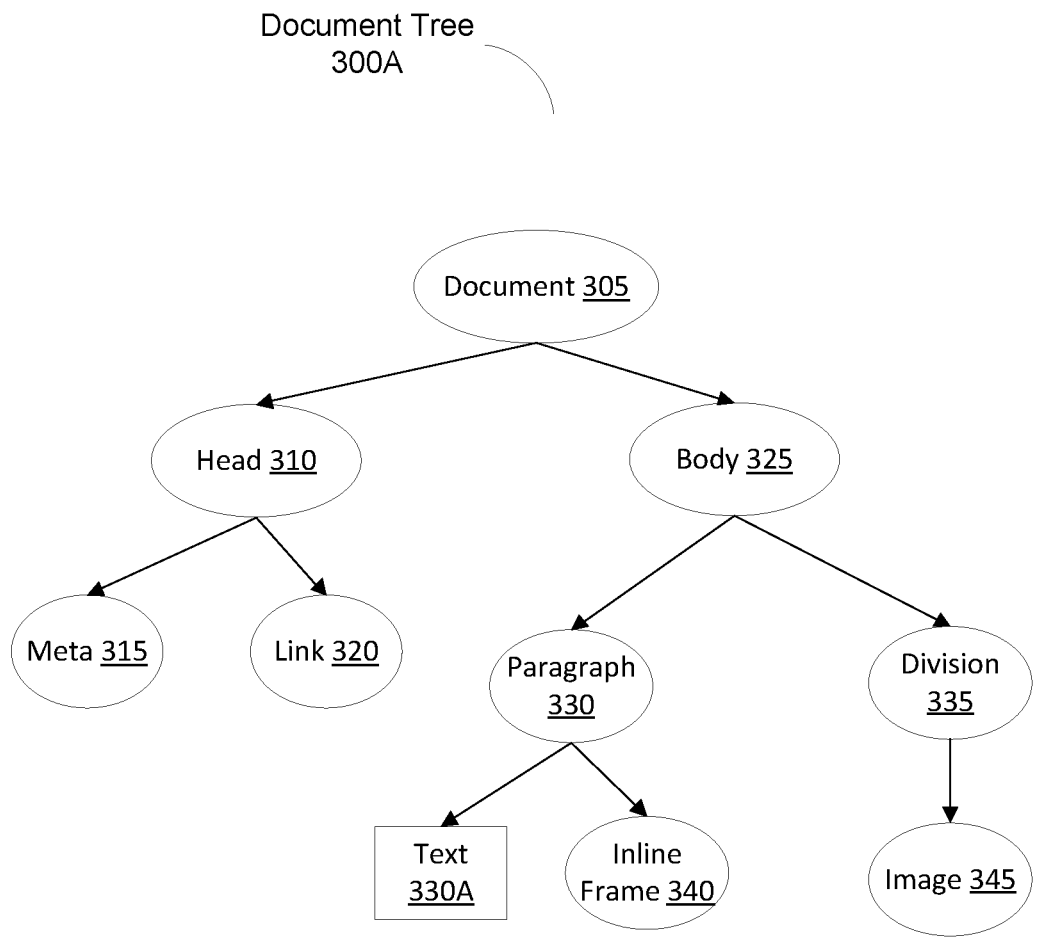
FIG. 3A is a block diagram depicting a document tree generated based on the information resource, according to an illustrative implementation.

Referring to FIG. 3A, FIG. 3A is a block diagram depicting a document tree 300A generated by the document tree generator 206 of the client device 125 based on the information resource 212, according to an illustrative implementation. In the example depicted in FIG. 3A, the document tree 300A can include a document content object 305, a head content object 310, body content object 325, meta content object 315, link content object 320, paragraph content object 330 including a text node 330A, division content object 335, an inline frame content object 340, and an image content object 345. In this example, the corresponding information resource 212 may have included a document content element (e.g., "<html>" tag), head content element (e.g., "<head>" tag), body content element (e.g., "<body>" tag), meta content element (e.g., "<meta>" tag), link content element (e.g., "<link>" tag), paragraph content element (e.g., "<p>" tag), division content element (e.g., "<div>" tag), inline frame content element (e.g., "<iframe>" tag), and an image content element (e.g., "<img>" tag). In this example, the document content object 305 located at the head of the document tree 300A can correspond to a document portion of the information resource 212. The head content object 310 can include descriptive data associated with the information resource 212. The meta content object 315 can include meta data associated with the information resource 212. The link content object 320 can include source specifier for style rules associated with the content elements 215A-N and the corresponding content objects for the information resource 212. The body content object 325 can define a body of the document portion (e.g., displayed content element 215'B) of the information resource 212. The paragraph content object 330 can include a text node 330 specifying inclusion of text for the information resource 212. The division content object 335 can define a separate division or section of the body of the document of the information resource 212. The inline frame content object 340 can define an inline frame to embed another content element 215A-N or another information resource into the information resource 212. The image content object 345 can define or reference an image to include into the information resource 212.

In the context of FIG. 3A, the interrupter module 214 can traverse the document tree 300A. While traversing the document tree 300A, the interrupter module 214 can select one of the content objects 305-345 based on various attributes of the respective content object 305-345 to change, modify, or remove the selected content object 305-345. For example, inline frame object 340 can include an information resource originating from a domain different from the information resource 212 based on the host names of the respective URLs. The interrupter module 214 can identify that the domain for the inline frame content object 340 is different from the domain for the information resource 212, and remove the inline frame content object 340 from the document tree 300A. In another example, the interrupter module 214 can identify that the division content object 335 includes the image content object 345 as a child content object. The image referenced in the image content object 345 can be from the same domain as the information resource 212. In this example, the interrupter module 214 can apply an optical character recognition analysis on the image referenced in the image content object 345 and detect that the image includes certain phrases, such as "click here," and remove the image reference from the image content object 345.

Using the document tree 300A generated by the document tree generator 206, the document tree verification module 225 can determine whether any of the content elements 215A-N is not successfully displayed in the current format. The document tree verification module 225 can determine whether any of the content elements 215A-N of the information resource 212 to be rendered do not have a corresponding content object in the document tree 300A generated by the document tree generator 206. The document tree verification module 225 can identify the content elements 215A-N of the information resource 212. The document tree verification module 225 can identify or access the document tree 300A generated by the document tree generator 206. For example, the document tree verification module 225 can invoke the function "document. documentElement" in JAVASCRIPT. The document tree verification module 225 can traverse the document tree 300A generated by the document tree generator 206. While traversing the document tree 300A, for each content element 215A-N of the information resource 212, the document tree verification module 225 can identify that none of the content elements 215A-N correspond to the respective content object of the document tree. In the example depicted in FIG. 3A, if the interrupter module 214 may have deleted the inline frame content object 340. The document tree verification module 225 can determine that the information resource 212 originally included an inline frame content element and traverse the document tree 300A to determine that the inline frame content element has been deleted from the document tree 300A.

The document tree verification module 225 can determine whether every content element 215A-N of the information resource 212 to be rendered has a corresponding content object in the document tree 300A generated by the document tree generator 206. The document tree verification module 225 can traverse the document tree 300A generated by the document tree generator 206. While traversing the document tree 300A, for each content element 215A-N of the information resource 212, the document tree verification module 225 can identify that every content element 215A-N corresponds to the respective content object of the document tree 300A.

The document tree verification module 225 can determine whether any additional content objects are added to the document tree 300A. For example, the interrupter module 214 may have added a canvas content object as a child object to the paragraph content object of the document tree 300A, such that the canvas content object will occlude another content object as an overlay on the displayed information resource 212'. While traversing the document tree 300A, for each content element 215A-N of the information resource 212, the document tree verification module 225 can identify that at least one of the content objects on the document tree 300A does not correspond to any of the content elements 215A-N of the information resource 212.

The document tree verification module 225 can determine that the document tree 300A has a correct number of content objects. The correct number of content objects may correspond to the number of content elements 215A-N to be rendered. The document tree verification module 225 can identify the length, cardinality, or number of content objects of the document tree 300A and compare to the number of content elements 215A-N of the information resource 212 to be rendered. Based on the comparison, the document tree verification module 225 can determine that the document tree 300A has a correct number of content objects.

The document tree verification module 225 can determine whether the document tree 300A is altered. In some implementations, the document tree verification module 225 can identify the attribute or property of each of the content objects of the document tree 300A. In some implementations, the document tree verification module 225 can identify the format and attributes for each of the content elements 215A-N. While traversing the document tree 300A, for each content element 215A-N of the information resource, the document tree verification module 225 can identify a corresponding content object of the document tree 300A. The document tree verification module 225 can compare the attribute or property of the corresponding content object of the document tree 300A to the attribute or property of the respective content element 215A-N of the information resource 212 to determine whether there is a match or an equivalent mapping. If there is at least one content object that does not match or have an equivalent mapping to the corresponding content element 215A-N, the document tree verification module 225 can determine that the corresponding content object of the document tree 300A for the respective content element 215A-N of the information resource 212 is altered. If all content objects that match or have an equivalent mapping to the corresponding content element 215A-N, the document tree verification module 225 can determine that the corresponding content object of the document tree 300A for the respective content element 215A-N of the information resource 212 is unaltered.

The document tree generator 206 can identify a subset of content objects of the document tree 300A that is to be rendered and a subset of content objects of the document tree 300A that is not to be rendered. In the example depicted in FIG. 3A, the subset of content objects to be rendered are content objects 325, 330, 335, and 345 and the subset of content objects not to be rendered are content objects 305, 310, 315, 320, and 340. The document tree generator 206 can identify the link content object 320 to import style rules (e.g., CSS style sheets) specified for the information resource 212. The document tree generator 206 can remove the subset of content objects that is not to be rendered from the document tree 300A. The document tree generator 206 can match each of the content objects in subset of the content objects that is to be rendered with the style rule specified in the information resource 212 to generate an object model.

Figure 3B:
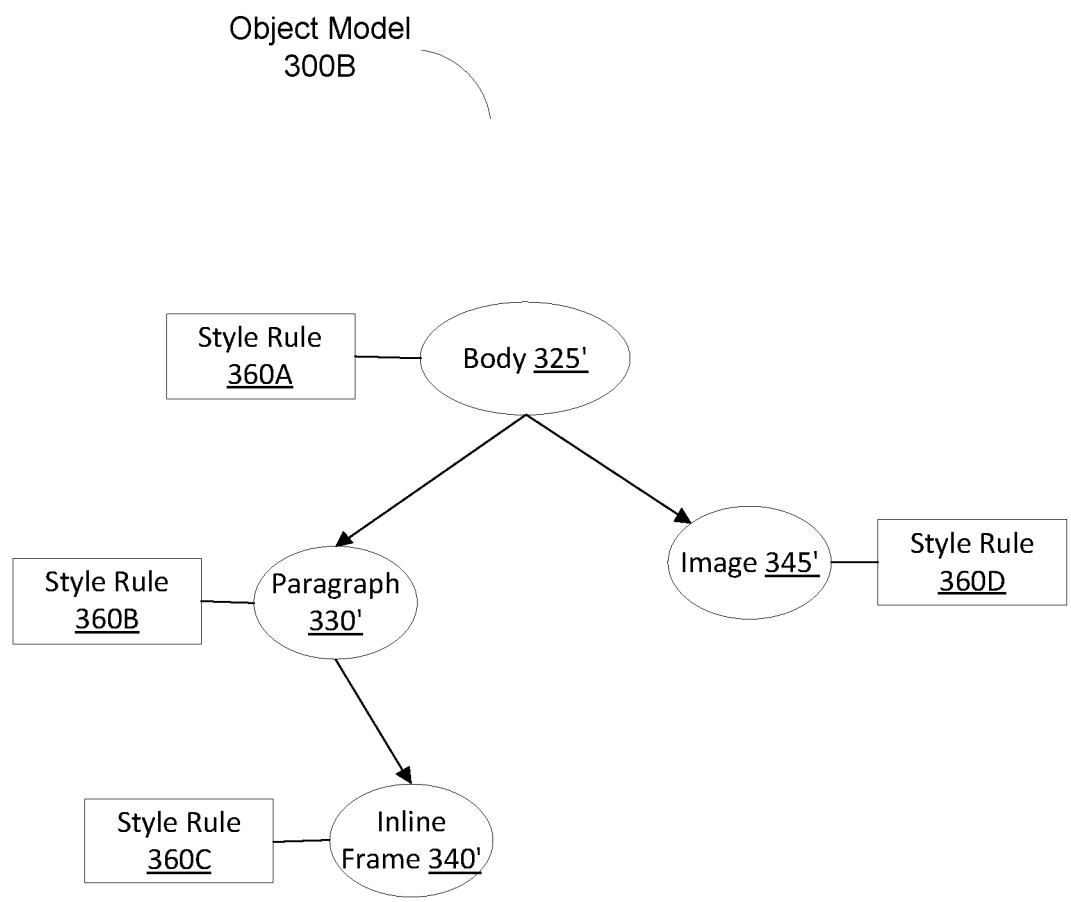
FIG. 3B is a block diagram depicting an object model with each content object matched to a style rule specified by the information resource, according to an illustrative implementation.

Referring to FIG. 3B, FIG. 3B is a block diagram depicting an object model 300B with each content object matched to a style rule by the document tree generator 206 based on the information resource 212, according to an illustrative implementation. In the example depicted in FIG. 3B, the object model 300B can include a body content object 325' matched with style rule 360A, a paragraph content object 330' matched with style rule 360B, inline frame content object 340' matched with style rule 360C, and image content object 345' matched with style rule 360D. Each of the style rules 360A-D can specify attributes or properties of the corresponding content objects 325', 330', 340', and 345'. For example, the style rule 360B can specify that the text appearing in paragraph content object 330' is to be colored red.

In the context of FIG. 3B, the interrupter module 214 can traverse the object model 300B, and change, modify, and remove one of the content objects 325', 330', 340', and 345' based on various attributes of the respective content object 325', 330', 340', and 345' and change, modify, or remove the corresponding style rule 360A-D. For example, the interrupter module 214 can identify that the inline frame content object 340' can dynamically resize or move in position. Based on the identification, the interrupter module 214 can set a display property of the style rule 360C matched with the inline frame content object 340' to null, thereby removing the content object from rendering and display by the client device 125.

Using the document tree with each content object matched to a style rule by the document tree as in object model 300B, the document tree verification module 225 can determine whether any of the content elements 215A-N is not successfully displayed in the current format. The document tree verification module 225 can determine whether any of the content elements 215A-N of the information resource 212 to be rendered do not have a corresponding content object in the object model 300B generated by the document tree generator 206. The document tree verification module 225 can identify the content elements 215A-N of the information resource 212. The document tree verification module 225 can identify or access the object model 300B processed by the document tree generator 206. For example, the document tree verification module 225 can invoke the function "getComputedStyle( )" in JAVASCRIPT. The document tree verification module 225 can determine whether every content element 215A-N of the information resource 212 to be rendered has a corresponding content object in the object model 300B. The document tree verification module 225 can traverse the object model 300B. While traversing the object model 200B, for each content element 215A-N of the information resource 212, the document tree verification module 225 can identify that none of the content objects of the object model 300B correspond to the respective content element 215A-N.

In some implementations, the document tree verification module 225 can determine whether any additional content objects are added to the object model 300B. For example, the interrupter module 214 may have added a table content object as a child object to the paragraph content object 330' of the object model 300B. While traversing the object model 300B, for each content element 215A-N of the information resource 212, the document tree verification module 225 can identify that at least one of the content objects on the object model 300B does not correspond to any of the content elements 215A-N of the information resource 212. The document tree verification module 225 can determine that the object model 300B has a correct number of content objects. The correct number of content objects may correspond to the number of content elements 215A-N to be rendered. The document tree verification module 225 can identify the length, cardinality, or number of content objects of the object model 300B and compare to the number of content elements 215A-N of the information resource 212 to be rendered. If the number of content objects match the number of content elements 215A-N to be rendered, the document tree verification module 225 can determine that the object model 300B has a correct number of content objects.

The document tree verification module 225 can determine whether the object model 300B is altered. In some implementations, the document tree verification module 225 can determine whether any of the matched style rules of the object model 300B is altered. In some implementations, the document tree verification module 225 can identify the attribute or property of each of the style rules matched to the respective content object of the object model 200B. In some implementations, the document tree verification module 225 can identify the format and attribute for each of the content elements 215A-N from the information resource 212. In some implementations, the document tree verification module 225 can identify the style rule for each of the content elements 215A-N specified in the information resource 212. While traversing the object model 300B, for each content element 215A-N of the information resource, the document tree verification module 225 can identify a corresponding content object of the object model 300B and identify a corresponding matched style rule. The document tree verification module 225 can compare the attribute or property of the corresponding style rule of the corresponding content object of the object model 300B to the attribute or property of the respective content element 215A-N of the information resource 212 to determine whether there is a match or an equivalent mapping. If there is at least one of the corresponding style rules of the corresponding content object does not match or have an equivalent mapping to the corresponding content element 215A-N, the document tree verification module 225 can determine that the corresponding content object of the object model 300B for the respective content element 215A-N of the information resource 212 is altered. If all of the corresponding style rules of the corresponding content object match or have an equivalent mapping to the corresponding content element 215A-N, the document tree verification module 225 can determine that the corresponding content object of the document tree 300A for the respective content element 215A-N of the information resource 212 is unaltered. In the example depicted in FIG. 3B, the interrupter module 214 may have set the display property of the style rule 360C for the inline frame content object 340' to null. The document tree verification module 225 can identify the display property of the style rule as specified in the information resource 212. If the display property of the style rule specified for the inline frame content element in the information resource 212 is not null, the document tree verification module 225 can determine that the corresponding matched style rule for the inline frame content element is altered.

The rendering tree generator 208 can generate a rendering tree for rendering the information resource 212. The rendering tree generator 208 can include a layout engine, rendering engine, or any module, engine, or process of the application 205 to prepare rendering of the information resource 212 on a display of the client device 125. In some implementations, the rendering tree generator 208 can generate the rendering tree based on the object model 300B or the document tree 300A. In some implementations, the rendering tree generator 208 can generate one or more render properties for each of the content objects and the matched style rule in the object model 300B. In some implementations, the rendering tree generator 208 can generate the one or more properties based on the properties or attributes specified in the respective content object in the document tree 300A or the matched style rule in the object model 300B. The rendering tree can include one or more nodes associated with each other in a hierarchical manner. For example, two nodes can have a parent-child relationship in a tree data structure. Each of the nodes in the rendering tree can correspond to a content element 215A-N of the information resource 212 that is to be rendered. Each of the nodes in the render can be matched to one or more rendering properties.

Figure 3C:
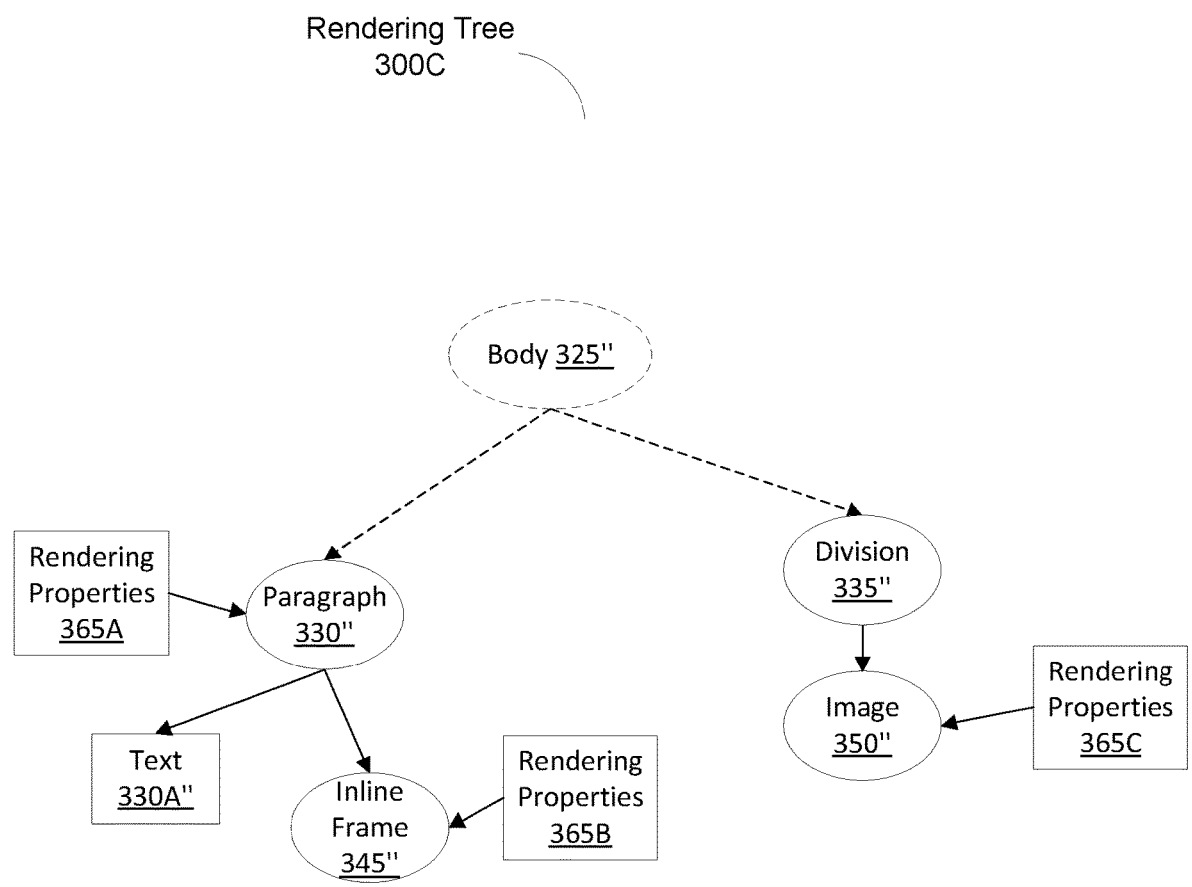
FIG. 3C is a block diagram depicting a rendering tree generated based on the document tree with each object matched to a style rule, according to an illustrative implementation.

Referring to FIG. 3C, FIG. 3C is a block diagram depicting a rendering tree 300C generated based on the object model 300B, according to an illustrative implementation. In the example depicted in FIG. 3C, the rendering tree 300C can include a body node 325", paragraph node 330", text node 330A", inline frame node 345", division node 335", and image node 350". The nodes of the rendering tree 300C may correspond to at least a subset of the content elements 215A-N of the information resource 212. Some of the nodes of the rendering tree 300C can have a rendering property 365A-C specifying rendering information for the respective node 330", 345", and 350". The rendering properties 365A-C can be applicable to the corresponding node and children node of the corresponding node. For example, the rendering information in rendering property 365A may be applicable to both paragraph node 330" and text node 330A".

In the context of FIG. 3C, the interrupter module 214 can traverse the rendering tree 300C. While traversing the rendering tree 300C, the interrupter module 214 can select one of the nodes based on various attributes of the respective nodes to change, modify, or remove the selected node or change or modify the one or more rendering properties of the selected node. For example, the interrupter module 214 can identify that the text node 330A" of the paragraph node 330" includes a link in black colored text. The interrupter module 214 can further identify the rendering property 365A for the paragraph node 330" and set the background to black, thereby decreasing the contrast between the text and the background when the information resource 212 is displayed by the client device 125.

Using the rendering tree 300C generated by the rendering tree generator 208, the rendering tree verification module 230 can determine whether any of the content elements 215A-N is not successfully displayed in the current format. The rendering tree verification module 230 can determine whether any of the content elements 215A-N of the information resource 212 to be rendered do not have a corresponding node in the rendering tree 300C generated by the rendering tree generator 208. The rendering tree verification module 230 can identify the content elements 215A-N of the information resource 212. The rendering tree verification module 230 can identify or access the rendering tree 300C generated by the rendering tree generator module 208. The rendering tree verification module 230 can traverse the rendering tree 300C. While traversing the rendering tree 300C, for each content element 215A-N of the information resource 212, the document tree verification module 225 can identify that none of the nodes in the rendering tree 300C correspond to the respective content element 215A-N. In the example depicted in FIG. 3C, the interrupter module 214 may have deleted the image node 350" and the corresponding rendering properties 360C. The image node 350" may have corresponded to an image content element in the information resource 212. The rendering tree verification module 230 can search the rendering tree 300C for a node corresponding to the image content element of the information resource 212. Finding none, the rendering tree verification module 230 can determine that none of the nodes in the rendering tree 300C correspond to the image content element of the information resource 212.

The render tree verification module 230 can determine whether every content element 215A-N of the information resource 212 to be rendered has a corresponding node in the rendering tree 300C generated by the render tree generator 208 The render tree verification module 230 can traverse the rendering tree 300C generated by the rendering tree generator 208. While traversing the rendering tree 300C, for each content element 215A-N of the information resource 212, the render tree verification module 230 can identify that every content element 215A-N corresponds to the respective node in the rendering tree 300C. The render tree verification module 230 can determine that the rendering tree 300C has a correct number of nodes. The correct number of nodes may correspond to the number of content elements 215A-N to be rendered. The render tree verification module 230 can identify the length, cardinality, or number of nodes of the rendering tree 300C and compare to the number of content elements 215A-N of the information resource 212 to be rendered. If the number of content objects matches the number of content elements 215A-N to be rendered, the render tree verification module 230 can determine that the rendering tree 300C has a correct number of nodes.

The rendering tree verification module 230 can determine whether any additional nodes are added to the rendering tree 300C. For example, the interrupter module 214 may have added another node as a child object to the paragraph content object 330" of the rendering tree 300C, such that the inline frame content object 340" is occluded in the displayed information resource 212' when rendered for display. While traversing the rendering tree 300C, for each content element 215A-N of the information resource 212, the document tree verification module 225 can identify that at least one of the nodes of the rendering tree 300C does not correspond to any of the content elements 215A-N of the information resource 212. In some implementations, the rendering tree verification module 230 can identify that the additional node in the rendering tree 300C is an overlay over another node corresponding to one of the content elements 215A-N of the information resource. For example, the rendering tree verification module 230 can identify two nodes of the rendering tree 300C with a coordinate position similar (e.g., within 10%) to each other based on the respective rendering properties. The rendering tree verification module 230 can identify the size and z-index for each of these two nodes from the respective rendering properties. Upon determining that the sizes specified in the rendering properties for the two nodes is similar (e.g., within 10%) and that the z-index of the additional node is higher than the node corresponding to one of the content elements 215A-N, the rendering tree verification module 230 can determine that the additional node of the rendering tree 300C is an overlay over another node corresponding to one of the content elements 215A-N.

The rendering tree verification module 230 can determine whether the rendering tree 300C is altered. In some implementations, the rendering tree verification module 230 can identify the rendering properties for each of the nodes in the rendering tree 300C. In some implementations, the rendering tree verification module 230 can identify the format and attribute for each of the content elements 215A-N specified in the information resource 212. In some implementations, the rendering tree verification module 230 can identify the style rule for each of the content elements 215A-N specified in the information resource 212. While traversing the rendering tree 300C, for each content element 215A-N of the information resource 212, the rendering tree verification module 230 can identify a corresponding node of the rendering tree 300C and one or more rendering properties for the respective node. The rendering tree verification module 230 can compare the one or more rendering properties for the corresponding node to the properties or attributes of the respective content element 215A-N of the information resource. If there is at least one node that does not match or have an equivalent mapping to the properties or attributes of the corresponding content element 215A-N, the rendering tree verification module 230 can determine that the corresponding node of the rendering tree 300C for the respective content element 215A-N of the information resource 212 is altered. If all the nodes of the rendering tree 300C that match or have an equivalent mapping to the properties or attributes of the corresponding content element 215A-N, the rendering tree verification module 230 can determine that the corresponding node of the rendering tree 300C for the respective content element 215A-N of the information resource 212 is unaltered. In the example depicted in FIG. 3C, the interrupter module 214 may have set the text size specified in the rendering properties 365A of the text node 330A" from 12 to 3. The rendering tree verification module 230 can identify the text size as specified in the information resource 212 for the corresponding paragraph content element. The rendering tree verification module 230 can compare the text size as specified in the information resource 212 and the rendering properties 365A of the text node 330"A. Upon determining that there is no match, the rendering tree verification module 230 can determine that the rendering properties for the node corresponding to the paragraph content element is altered.

The rendering tree generator 208 can process a layout based on the rendering tree 300C. The layout can include one or more sub-layouts in a list, array, or tree data structure. Each of the one or more sub-layouts can correspond to a node on the rendering tree 300C. Each of the one or more sub-layouts can include rendering information specifying how the node corresponding to one of the content elements 215A-N is to be rendered on a display of the client device 125. For example, a sub-layout may specify the absolute pixel positions a node is to occupy on the display. The rendering tree generator 208 can traverse the nodes of the rendering tree 300C. For each node traversed, the rendering tree generator 208 can generate the corresponding sub-layout based on the one or more rendering properties for the node. The display module 210 can additionally process the layout generated by the rendering tree generator 208 for displaying the information resource 212 on the client device 125.

The interrupter module 214 can change, modify, or otherwise alter the layout generated by the rendering tree generator 208. The interrupter module 214 can select one of the sub-layouts based on various attributes of the respective sub-layout to change, modify, or remove the selected sub-layout. For example, based on the absolute pixel positions of each sub-layout, the interrupter module 214 can identify one sub-layout that is to be rendered generally along the top of the information resource 212' (e.g., displayed content element 215'A of FIG. 2B). Upon identified the sub-layout to be rendered generally along the top of the information resource 212', the interrupter module 214 can insert an overlay sub-layout into the layout such that the newly inserted overlay layout occludes the selected sub-layout.

Using the layout generated by the rendering tree generator 208, the rendering tree verification module 230 can determine whether any of the content elements 215A-N is not successfully displayed in the current format. The rendering tree verification module 230 can determine whether any of the content elements 215A-N of the information resource 212 to be rendered does not have a corresponding sub-layout in the layout generated by the rendering tree generator 208. The rendering tree verification module 230 can identify the content elements 215A-N of the information resource 212 that is to be rendered. The rendering tree verification module 230 can identify or access the layout generated by the rendering tree generator 208. The rendering tree verification module 230 can traverse the layout. While traversing the layout, for each of the content elements 215A-N of the information resource 212, the rendering tree verification module 230 can identify that none of the sub-layouts in the layout correspond to the respective content element 215A-N.

The render tree verification module 230 can determine whether every content element 215A-N of the information resource 212 to be rendered has a corresponding sub-layout in the layout. The render tree verification module 230 can traverse the layout generated by the rendering tree generator 208. While traversing the layout, for each content element 215A-N of the information resource 212, the render tree verification module 230 can identify that every content element 215A-N corresponds to the respective sub-layout in the rendering tree 300C. The render tree verification module 230 can determine that the layout has a correct number of content objects. The correct number of sub-layouts may correspond to the number of content elements 215A-N to be rendered. The render tree verification module 230 can identify the length, cardinality, or number of sub-layout of the layout and compare to the number of content elements 215A-N of the information resource 212 to be rendered. If the number of sub-layouts of the layout matches the number of content elements 215A-N to be rendered, the render tree verification module 230 can determine that the layout has a correct number of sub-layouts.

The rendering tree verification module 230 can determine whether any additional sub-layouts are added to the layout. For example, the interrupter module 214 may insert an overlay sub-layout into the layout such that the newly inserted overly layout occludes another sub-layout, such as by having a higher z-index. In some implementations, the rendering tree verification module 230 can calculate a number of content elements 215A-N of the information resource 212 to be rendered. The rendering tree verification module 230 can identify a number of sub-layouts in the layout generated from the rendering tree 300C. The rendering tree verification module 230 can compare the number of content elements 215A-N to be rendered to the number of sub-layouts. If the number of sub layouts is greater than the number of content elements 215A-N by a predetermined threshold, the rendering tree verification module 230 can determine that there are one or more additional sub-layouts. In some implementations, the rendering tree verification module 230 can identify that the additional sub-layout is an overlay over another sub-layout. For example, the rendering tree verification module 230 can identify two sub-layouts of the layout with a coordinate position similar (e.g., within 10%) to each other based on the respective rendering information. The rendering tree verification module 230 can identify the size and z-index for each of these two sub-layouts from the respective rendering information. Upon determining that the sizes specified in the rendering properties for the two sub-layouts is similar (e.g., within 10%) and that the z-index of the additional sub-layout is higher than the sub-layout corresponding to one of the content elements 215A-N, the rendering tree verification module 230 can determine that the additional sub-layout of the layout is an overlay over another sub-layout corresponding to one of the content elements 215A-N.

The rendering tree verification module 230 can determine whether the layout generated by the rendering tree generator 208 is altered. In some implementations, the rendering tree verification module 230 can identify the format and attribute for each of the content elements 215A-N specified in the information resource 212. In some implementations, the rendering tree verification module 230 can identify the style rule for each of the content elements 215A-N specified in the information resource 212. In some implementations, the rendering tree verification module 230 can access the properties or attributes for each content object of the document tree 300A. In some implementations, the rendering tree verification module 230 can access the properties or attributes in the matched style rule for each of the content objects of the object model 300B. While traversing the layout, for each content element 215A-N of the information resource 212, the rendering tree verification module 230 can identify a corresponding sub-layout and the rendering information for the sub-layout. The rendering tree verification module 230 can compare the one or more rendering properties for the corresponding node to the properties or attributes of the respective content element 215A-N of the information resource 212 or the properties or attributes of the respective style rule. If there is at least one sub-layout that does not match or have an equivalent mapping to the properties or attributes of the corresponding content element 215A-N, the rendering tree verification module 230 can determine that the corresponding sub-layout of the layout for the respective content element 215A-N of the information resource 212 is altered. If all the sub-layout of the layout that match or have an equivalent mapping to the properties or attributes of the corresponding content element 215A-N, the rendering tree verification module 230 can determine that the corresponding sub-layout of the layout for the respective content element 215A-N of the information resource 212 is unaltered.

Responsive to determining that the one or more content elements 215A-N are not successfully displayed in one format, the document tree verification module 225 or the rendering tree verification module 230 can cause the application 205 to render one of the content elements 215A-N in another format. The element modifier module 240 can select another pre-generated format. In some implementations, the one or more formats may be pre-generated by the format prioritization module 145. In some implementations, the element modifier module 240 can generate one or more formats. Visual characteristics of the one or more formats generated by the element modifier module 240 may different in color, font, font size, font type, size, and position, among others.

In some implementations, the element format modifier module 240 can modify the one or more content elements 215A-N from one format to another format. The other format can specify different visual characteristics for the respective content element 215A-N, such as color, font, font size, font type, size, and position, among others. For example, the other format can specify that the size of the content element 215A-N is to be 300×200 pixels, whereas the previous format specified that the size of the content element 215A-N is to be 100×400 pixels. In some implementations, the element format modifier module 240 can modify the one or more content elements 215A-N by including the other format. In some implementations, the element format modifier module 240 can select the other format based on the prioritization order specified in the respective content element 215A-N or the information resource 212. For example, if the prioritization order specified for one of the content elements 215A-N is "Format 1232z," "Format 2084m1" and then "Format H80k1," the element format modifier module 240 can modify the respective content element 215A-N using is "Format 1232z," "Format 2084m1" and then "Format H80k1" in accordance to the prioritization order.

The element format modifier module 240 can modify the one or more content elements 215A-N from one format to another format repeatedly any number of times or until a predetermined threshold is met. By modifying the one or more content elements 215A-N from one format to another, the content render verification script 220 can ensure that the content of the information resource 212 is properly processed, rendered, and displayed by the client device 125. The content render verification module 215 is thus able to thwart unauthorized attempts by the interrupter module 214 to interfere with the rendering of the information resource 212.

The element format modifier module 240 can maintain a counter for an attempt count indicating a number of attempts to display the one or more content elements 215A-N on the information resource 212. Responsive to determining that the one or more content elements 215A-N are not successfully displayed in one format, the element format modifier module 240 can increment the attempt count. Each time the attempt count is incremented, the element format modifier module 240 can modify the one or more content elements 215A-N from one format to another format. In some implementations, the element format modifier module 240 can determine whether the attempt count is above or below the predetermined threshold. If the attempt count is below the predetermined threshold, the element format modifier module 240 can continue modifying the one or more content elements 215A-N using another format. If the attempt count is above or equal to the predetermined threshold, the element format modifier module 240 can terminate, cease, or stop all functionalities of the content render verification script 220. In some implementations, if the attempt count is above or equal to the predetermined threshold, the element format modifier module 240 can terminate, cease, or stop the display of additional content elements 215A-N (e.g., content element 215D of FIG. 2B).

In some implementations, if the attempt count is above or equal to the predetermined threshold, the element format modifier module 240 can transmit a pingback to an external device, such as the data processing system 110, content provider computing devices 115, or content publisher computing devices 120. The negative pingback can indicate that the content render verification script 220 did not succeed or failed to display the one or more content elements 215A-N of the information resource 212. The negative pingback can include a content element identifier corresponding to the content element 215A-N that did not succeed or failed to be displayed on the information resource 212, format identifiers corresponding to the respective formats of the content element 215A-N that did not succeed or failed to be displayed on the information resource 212, a device identifier corresponding to the client device 125 and an application profile corresponding to an application type of the application 205. Receipt of the negative pingback can cause the data processing system 110 to update the database 150. In some implementations, if the attempt count is above or equal to the predetermined threshold, the element format modifier module 240 can cause the application 205 to display an alert. The alert may include indication that an authorized script (e.g., interrupter module 214) may be running on the client device 215. In some implementations, lack of any positive or negative pingback can cause the data processing system 110 to update the database 150. For example, if the data processing system 110 does not receive any pingback within a predefined time window, the data processing system 110 can update the database 150 to indicate that the respective formats of the content elements 215A-N were not successfully displayed.

The element format modifier module 240 can maintain a counter for a modify count indicating a number of modifications for the one or more content elements 215A-N. Responsive to determining that the one or more content elements 215A-N are not successfully displayed in one format or responsive to modifying the one or more content elements 215A-N from one format to the another format, the element format modifier module 240 can increment the counter indicating the number of modifications. The element format modifier module 240 can determine whether the modify count is below or above a number of formats for the one or more content elements 215A-N. If the modify count is below the number of formats, the element format modifier module 240 can continue to modify the one or more content elements 215A-N from one format to another format and increment the modify count. If the modify count is above or equal to the number of formats, the content element retrieval module 235, in conjunction with the element format modifier module 240, can transmit a request for additional content to the data processing system 110, content provider computing devices 115, or content publisher computing devices 120. The request for additional content can include a device identifier corresponding to the client device 125 and an application profile corresponding to an application type of the application 205. In turn, the content element retrieval module 235 can receive an additional content element 215A-N including other formats.

Responsive to determining that the document tree 300A and the object model 300B are not altered, the document tree verification module 225 can determine that the one or more content elements 215A-N are successfully displayed in the respective format. Responsive to determining that the rendering tree 300C or the layout is not altered, the render tree verification module 230 can determine that the one or more content elements 215A-N are successfully displayed in the respective format. Responsive to determining that the one or more content elements 215A-N are successfully displayed in any format, the element format modifier module 240 can transmit a positive pingback indicating successful rendering of the one or more content elements 215A-N on the information resource 212. The positive pingback can include a content element identifier corresponding to the content element 215A-N that succeeded in being displayed on the information resource 212, format identifiers corresponding to the respective subset of formats of the content element 215A-N that did not succeed or failed to be displayed on the information resource 212, format identifiers corresponding to the respective format of the content element 215 that succeeded in being displayed on the information resource 212, a device identifier corresponding to the client device 125 and an application profile corresponding to an application type of the application 205. Receipt of the positive pingback can cause the data processing system 110 to update the database 150.

Responsive to determining that the one or more content elements 215A-N is successfully displayed in any format, the content element retrieval module 235 can display additional or another content element 215A-N of the information resource 212. In the example depicted in FIG. 2B, the content element retrieval module 235 can cause the application 205 to make visible the fifth content element 215E. In some implementations, the content element retrieval module 235 can determine whether the additional content element is received from the data processing system 110, content provider computing devices 115, or content publisher computing devices 120. If the content element retrieval module 235 determines that the additional was not received, the content element retrieval module 235 can transmit a request for additional content to the data processing system 110, content provider computing devices 115, or content publisher computing devices 120. The content element retrieval module 235 can subsequently receive the additional content element from the data processing system 110, content provider computing devices 115, or content publisher computing devices 120. If the content element retrieval module 235 determines that the additional content element was received, the content element retrieval module 235 can retrieve or access the additional content element from the local memory or cache of the client device 125. The content element retrieval module 235 can cause the application 205 to process the additional content element and the client device 125 to render and display the additional content element.

Referring again to FIG. 1 in conjunction with FIG. 2A, when the request for additional content, positive pingback, or negative pingback is transmitted by the client device 125 and is received by the data processing system 110, the format prioritization module 145 can update the database 150 based on the request for additional content, positive pingback, or negative pingback. The database 150 can include one or more entries. Each of the entries can include list or set of accepted format identifiers and content elements identifiers corresponding to formats and content elements successfully or unsuccessfully displayed by the respective client device 125 arranged by client identifier and an application profile.

In some implementations, responsive to receiving the request for additional content or the request for content from the client device 125, the format prioritization module 145 can identify the device identifier and the application profile from the request. The format prioritization module 145 can access the database 150 to identify the device identifier and the application profile from the one or more entries maintained on the database 150. From the one or more entries maintained on the database 150, the format prioritization module 145 can select the one or more content elements 215A-N and the respective formats based the device identifier and the application profile. In some implementations, the format prioritization module 145 can identify the format identifiers and the content element identifiers from the one or more entries maintained on the database 150 using the device identifier and the application profile to select formats and content elements 215A-N that were previously successfully displayed on the client device 125.

In some implementations, the prioritization module 145 can calculate, for each format of each of the one or more content elements, a likelihood of success that the respective content element in the respective format will be rendered or displayed by the client device 125 based on the device identifier and the application profile. In some implementations, the prioritization module 145 can identify a number of successes and number of failures for the application profile across a plurality of device identifiers from the one or more entries maintained in the database 150. The prioritization module 145 can calculate the likelihood of success that the respective content element in the respective format will be rendered or displayed based on the number of successes and the number of failures. The prioritization module 145 can determine the prioritization order based on the likelihood of success for each of the formats for each of the one or more content elements of the information resource 212.

The format prioritization module 145 can transmit the one or more content elements 215A-N and the respective formats to client device 125. The format prioritization module 145 can subsequently receive a positive pingback or negative pingback from the client device 125. Based on receiving the positive pingback or negative pingback, the format prioritization module 145 can determine whether client device 125 successfully rendered or displayed the one or more content elements 215A-N and the respective formats to the client device 125.

If the format prioritization module 145 determines that the client device 125 did not successfully render or display one or more content elements 215A-N and the respective formats (e.g., received a negative pingback), the format prioritization module 145 can update the one or more entries maintained by the database 150 to include an indication of failure, the content element identifiers, and the format identifiers corresponding to the content elements 215A-N and the formats that were not successfully rendered by the client device 125. The format prioritization module 145 can maintain a counter for attempt counts indicating a number of attempts of transmitting the one or more formats for each of one or more content elements 215A-N on the information resource 212 to the client device 125. The format prioritization module 145 can subsequently determine whether the attempt count is below or above a predetermined threshold. The predetermined threshold can indicate or represent the number of transmissions of various formats and content elements that the format prioritization module 145 permits prior to termination of communications with the client device 125. If the attempt count is below the predetermined threshold, the format prioritization module 145 can select one or more other formats for each of one or more other content elements to transmit to the client device 125. If the attempt count is above the predetermined threshold, the format prioritization module 145, in conjunction with the one or more other modules of the data processing system 110, can termination communications between the data processing system 110 and the format prioritization module 145.

Responsive to determining that the one or more content elements 215A-N are not successfully displayed in one format, the element format modifier module 240 can increment the attempt count. Each time the attempt count is incremented, the element format modifier module 240 can modify the one or more content elements 215A-N from one format to another format. In some implementations, the element format modifier module 240 can determine whether the attempt count is above or below the predetermined threshold. If the attempt count is below the predetermined threshold, the element format modifier module 240 can continue modifying the one or more content elements 215A-N using another format. If the attempt count is above or equal to the predetermined threshold, the element format modifier module 240 can terminate, cease, or stop all functionalities of the content render verification script 220. In some implementations, if the attempt count is above or equal to the predetermined threshold, the element format modifier module 240 can terminate, cease, or stop the display of additional content elements 215A-N (e.g., content element 215D of FIG. 2B).

If the format prioritization module 145 determines that the client device 125 successfully rendered or displayed one or more content elements 215A-N and the respective formats (e.g., received a positive pingback), the format prioritization module 145 can update the one or more entries maintained by the database 150 to include an indication of success the content element identifiers, and the format identifiers corresponding to the content elements 215A-N and the formats that were successfully rendered by the client device 125. In some implementations, the content selection module 130 in conjunction with the format prioritization module 145 can select additional content elements based on the one or more updated entries of the database 150 and transmit the selected additional content elements to the client device 125. In some implementations, selection of the formats for the additional content elements and the content elements based on the updated entries of the database 150 may increase a likelihood that the client device 125 will successfully render the additional content elements. For example, the database 150 may indicate that the fifth format of a content element previously lead to a successful rendering on the client device 125. In subsequent requests for content from the client device 125, the content selection module 130 can select the fifth format for the content element as the first format to be processed by the client device 125.

Figure 4:
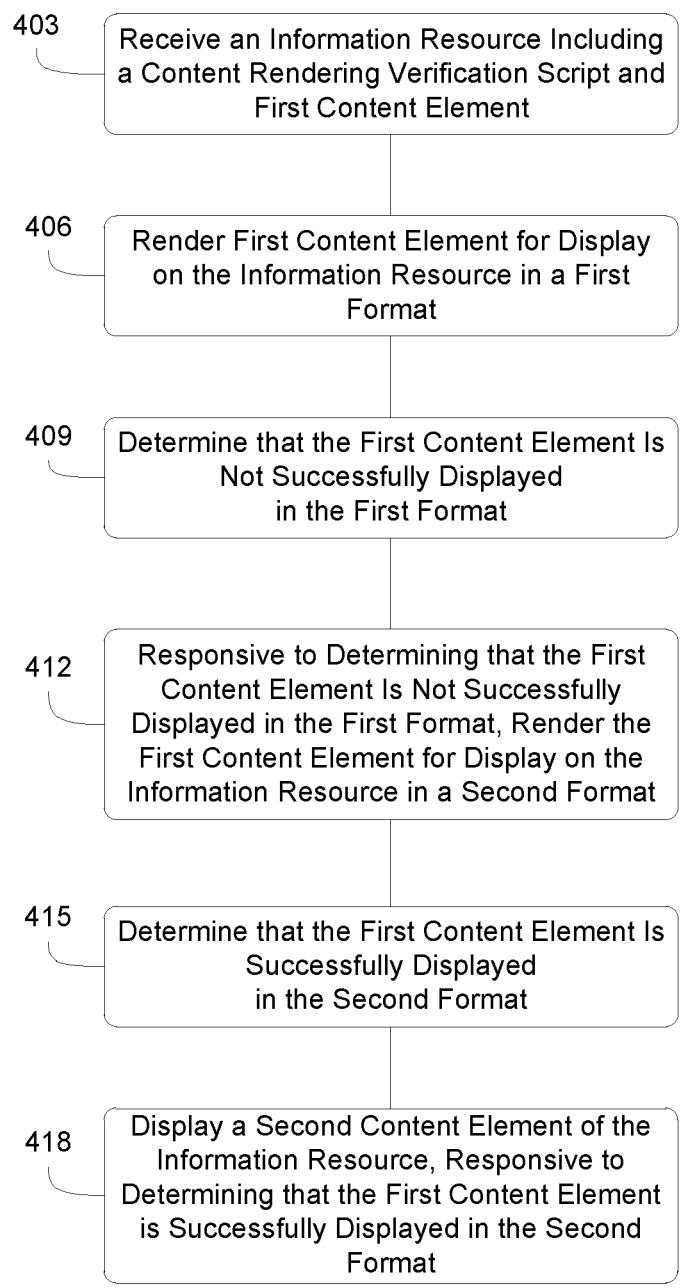
FIG. 4 is a flow diagram depicting a method of deploying countermeasures against unauthorized scripts interfering with the rendering of content elements on information resources, according to an illustrative implementation.
Figure 7:
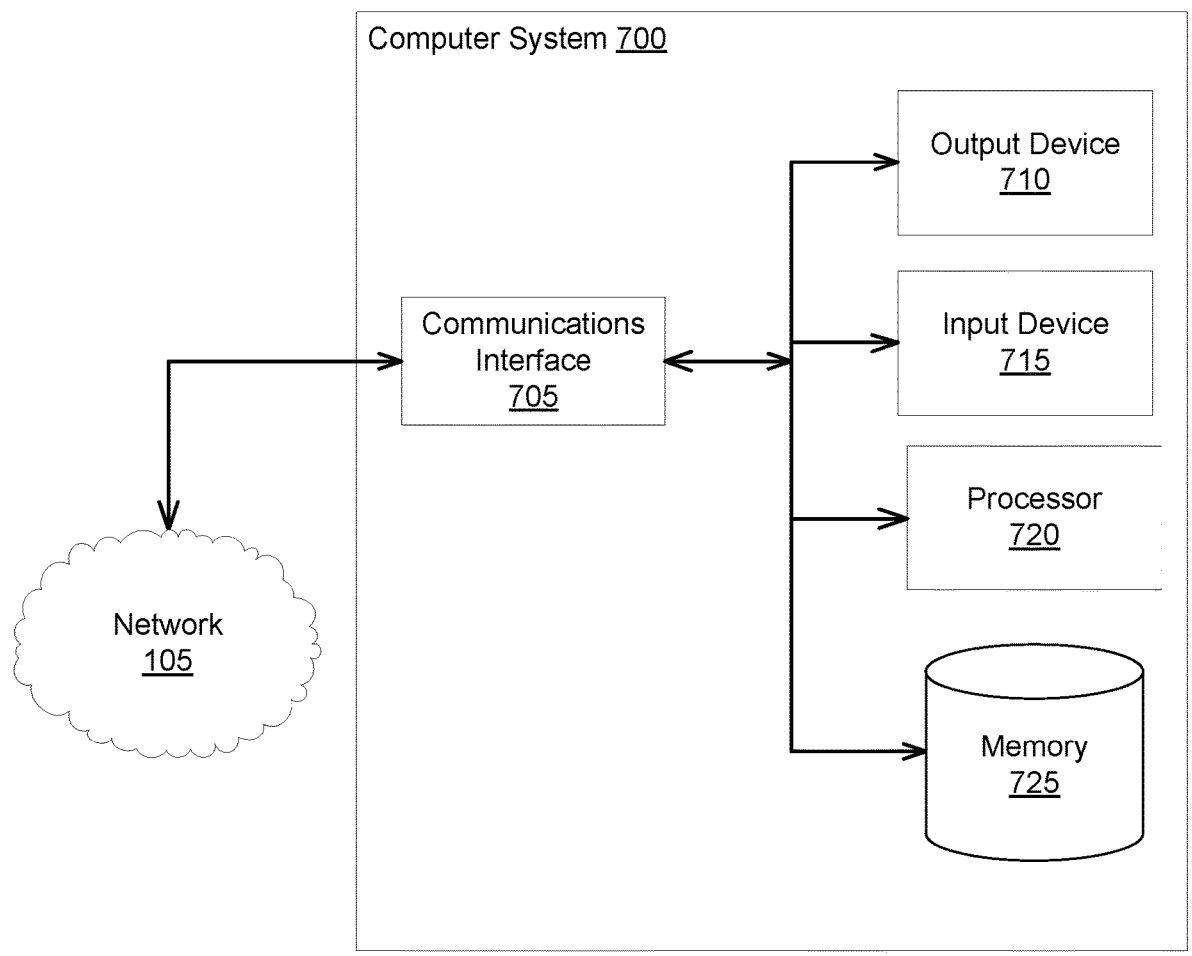
FIG. 7 is a block diagram illustrating a general architecture for a computer system that may be employed to implement elements of the systems and methods described and illustrated herein, according to an illustrative implementation.

Referring to FIG. 4, FIG. 4 is a flow diagram depicting a method 400 of attributing a scroll event on an application. The functionality described herein with respect to method 400 can be performed or otherwise executed by the data processing system 110 or client device 125 as shown in FIG. 1, the content display management system 200 as shown in FIG. 2, or a computing device as shown in FIG. 7, or any combination thereof. In brief overview, the client device can receive an information resource including a content render verification script and a first content element (BLOCK 403). The client device can render the first content element for display on the information resource in a first format (BLOCK 406). The client device can determine that the first content element is not successfully displayed in the first format (BLOCK 409). The client device can, responsive to determining that the first content element is not successfully displayed in the first format, render the first content element for display on the information resource in a second format (BLOCK 412). The client device can determine that the first content element is successfully displayed in the second format (BLOCK 415). The client device can display a second content element of the information resource, responsive to determining that first content element is successfully displayed in the second format (BLOCK 418).

In further detail, the client device can receive an information resource including a content render verification script and a first content element (BLOCK 403). The information resource and the first content element of the information resource can be received via the network from the data processing system, the content publisher computing device, or the content provider computing device. In some implementations, the information resource and the first content element can be from the same source (e.g., the data processing system). In some implementation, the same source may be identified by a similar identifier. For example, the information resource may correspond to the URL "www.example.com/index.html" whereas one of the content elements corresponds to "www.example.com/q31.html." In this example, the host names in the URL for the information resource and the content elements are the same. In some implementations, the information resource and the first content element can be from the different sources identified by different identifiers. For example, the information resource may correspond to the URL "www.example.com/home.html" whereas first content element may correspond to the URL "www.example2.com/ci_n31.img."

The information resource can include script, markup, or otherwise code processed by the application and executed by the one or more processors of the client device. For example, the information resource can include HyperText Markup Language (HTML), Extensible HyperText Markup Language (XHTML), Extensible Markup Language (XML), Cascading Style Sheets (CSS), and JAVASCRIPT, or any combination thereof. The information resource can include first content element, one or more corresponding style rules, and the content render verification script. Each of the content elements can correspond to a segment of the code of the information resource. In some implementations, each of the content elements can include an HTML element. An HTML element can include, for example, a heading, body, paragraph, division, section, inline frame, image, canvas, applet, script, audio, video, table, and list, among others. Each of the content elements can include one or more formats. Each of the one or more formats of each of the content elements can include a corresponding attribute. Examples of attributes for content elements may include color, font, font size, font type, size, and position, among others. Each of the one more style rules (e.g., CSS style rules) can specify one or more visual properties of the characteristic of the corresponding format of the respective the content elements.

The content render verification script can include computer-executable instructions. The computer-executable instructions can include a script, such as HyperText Markup Language (HTML), Extensible HyperText Markup Language (XHTML), Extensible Markup Language (XML), Cascading Style Sheets (CSS), and JAVASCRIPT, among others. The computer-executable instructions can be executed by an application of the client device, for example, the application that caused the client device to transmit the request for content received by the data processing system. The application can include, for example, an Internet browser, mobile application, or any other computer program capable of reading and executing the computer-executable instructions. In brief overview, the computer-executable instructions, when executed by one or more processors of the client device 125, can cause an application running on one or more processors of the client device to: (1) render the first content element for display on the information resource in a first format; (2) determine that the first content element is not successfully displayed in the first format; (3) responsive to determining that the first content element is not successfully displayed in the first format, render the first content element for display on the information resource in a second format; (4) determine that the first content element is successfully displayed in the second format; and (5) display a second content element of the information resource responsive to determining that the first content element is successfully displayed in the second format.

The client device can render the first content element for display on the information resource in a first format (BLOCK 406). In some implementations, the application can process each of the content elements of the information resource to generate a document tree. For example, the application can parse the HTML markup of the information resource to generate a Document Object Model (DOM) tree. The document tree can include one or more content objects associated with each other in a hierarchical manner. For example, two content objects in the DOM tree can have a parent-child relationship in a tree data structure. Each of the content objects can correspond to one format for one of the first content element. Each of the content objects in the document tree can include one or more properties or attributes.

The application can identify a subset of content objects of the document tree that is to be rendered and a subset of content objects of the document tree that is not to be rendered. The application can identify the link content object of the document tree to import style rules (e.g., CSS style sheets) specified for the information resource. The application can remove the subset of content objects that is not to be rendered from the document tree. The application can match each of the content objects in subset of the content objects that is to be rendered with the style rule specified in the information resource to generate an object model.

The application can generate a rendering tree for rendering the information resource. The application can include a layout engine, rendering engine, or any module, engine, or process of the application to prepare rendering of the information resource on a display of the client device. In some implementations, the application can generate the rendering tree based on the object model or the document tree. In some implementations, the application can generate one or more render properties for each of the content objects and the matched style rule in the object model. In some implementations, the application can generate the one or more properties based on the properties or attributes specified in the respective content object in the document tree or the matched style rule in the object model. The rendering tree can include one or more nodes associated with each other in a hierarchical manner. For example, two nodes can have a parent-child relationship in a tree data structure. Each of the nodes in the rendering tree can correspond to a content element of the information resource that is to be rendered. Each of the nodes in the render can be matched to one or more rendering properties.

The application can process a layout based on the rendering tree. The layout can include one or more sub-layouts in a list, array, or tree data structure. Each of the one or more sub-layouts can correspond to a node on the rendering tree. Each of the one or more sub-layouts can include rendering information specifying how the node corresponding to one of the content elements is to be rendered on a display of the client device. For example, a sub-layout may specify the absolute pixel positions a node is to occupy on the display of the client device. The application can traverse the nodes of the rendering tree. For each node traversed, the application can generate the corresponding sub-layout based on the one or more rendering properties for the node. The application can additionally process the layout generated by the rendering tree generator for displaying the information resource on the client device.

The client device can determine that the first content element is not successfully displayed in the first format (BLOCK 409). The interrupter module can change, modify, or remove the first content element of the information resource based on various attributes associated with the first content element, thereby causing the first content element in the first format not be successfully displayed. The interrupter module can be a script or computer program on the application (e.g., plug-in for a web browser), another application, computer program, or process running on the client device, or an application, computer program, or process running on another device such as the proxy device In some implementations, the interrupter module can change, modify, or remove the one or more content elements of the information resource arbitrarily or randomly. This may result in the respective alteration of the display content element on the displayed information resource. The interrupter module can identify a type of content for each of the content elements of the information resource and apply a content alteration policy to change, modify, or remove the respective content elements based on the identified type of content. In general, the interrupter module can use any attribute associated with the content elements to change, modify, or remove one or more of the content elements of the information resource, thereby causing the alteration of behavior of the displayed information resource. The content render verification script of the client device can determine that at least one of first content element is not successfully displayed and modify the respective content elements to prevent alteration of the content elements by the interrupter module.

In the context of render trees, the interrupter module can traverse the document tree. While traversing the document tree, the interrupter module can select one of the content objects (such as the first content object corresponding to the first content element) based on various attributes of the first content object to change, modify, or remove the selected content object.

Using the document tree generated by the application, the client device can determine whether any of the content elements is not successfully displayed in the current format. The client device can determine whether any of the content elements of the information resource to be rendered do not have a corresponding content object in the document tree generated by the application. The client device can identify the content elements of the information resource. The client device can identify or access the document tree generated by the application. For example, the client device can invoke the function "document. documentElement" in JavaScript. The client device can traverse the document tree generated by the application. While traversing the document tree, for each content elements of the information resource, the client device can identify that none of the content elements correspond to the respective content elements In some implementations, the client device can determine whether any additional content objects are added to the document tree. For example, the interrupter module may have added a canvas content object as a child object to the paragraph content object of the document tree, such that the canvas content object will occlude another content object as an overlay on the displayed information resource. While traversing the document tree, for each content elements of the information resource, the client device can identify that at least one of the content objects on the document tree does not correspond to any of the content elements of the information resource.

The client device can determine whether the document tree is altered. In some implementations, the client device can identify the attribute or property of each of the content objects of the document tree. In some implementations, the client device can identify the format and attributes for each of the content elements. While traversing the document tree, for each content elements of the information resource, the client device can identify a corresponding content object of the document tree. The client device can compare the attribute or property of the corresponding content object of the document tree to the attribute or property of the respective content elements of the information resource to determine whether there is a match or an equivalent mapping. Based on the comparison, the client device can determine that the corresponding content object of the document tree for the respective content elements of the information resource is altered.

The application can identify a subset of content objects of the document tree that is to be rendered and a subset of content objects of the document tree that is not to be rendered. The application can identify the link content object of the document tree to import style rules (e.g., CSS style sheets) specified for the information resource. The application can remove the subset of content objects that is not to be rendered from the document tree. The application can match each of the content objects in subset of the content objects that is to be rendered with the style rule specified in the information resource to generate an object model.

In the context of object models, the interrupter module can traverse the object model, and change, modify, and remove one of the content objects (such as the first content object corresponding to the first content element) based on various attributes of the respective content object and change, modify, or remove the corresponding style rule.

Using the document tree with each content object matched to a style rule by the document tree as in object model, the client device can determine whether any of the content elements is not successfully displayed in the current format. The client device can determine whether any of the content elements of the information resource 212 to be rendered do not have a corresponding content object in the object model generated by the application. The client device can identify the content elements of the information resource. The client device can identify or access the object model processed by the application. For example, the client device can invoke the function "getComputedStyle( )" in JavaScript. The client device can traverse the object model. While traversing the object model, for each content elements of the information resource, the client device can identify that none of the content objects of the object model correspond to the respective content elements.

In some implementations, the client device can determine whether any additional content objects are added to the object model. While traversing the object model, for each content elements of the information resource, the client device can identify that at least one of the content objects on the object model does not correspond to any of the content elements of the information resource.

The client device can determine whether the object model is altered. In some implementations, the client device can determine whether any of the matched style rules of the object model is altered. In some implementations, the client device can identify the attribute or property of each of the style rules matched to the respective content object of the object model. In some implementations, the client device can identify the format and attribute for each of the content elements from the information resource. In some implementations, the client device can identify the style rule for each of the content elements specified in the information resource. While traversing the object model, for each content elements of the information resource, the client device can identify a corresponding content object of the object model and identify a corresponding matched style rule. The client device can compare the attribute or property of the corresponding style rule of the corresponding content object of the object model to the attribute or property of the respective content elements of the information resource to determine whether there is a match or an equivalent mapping. Based on the comparison, the client device can determine that the corresponding matched style rule of content object of the document tree for the respective content elements of the information resource is altered.

In the context of rendering trees, the interrupter module can traverse the rendering tree. While traversing the rendering tree, the interrupter module can select one of the nodes (such as the node corresponding toe the first content element) based on various attributes of the respective nodes to change, modify, or remove the selected node or change or modify the one or more rendering properties of the selected node.

Using the rendering tree generated by the application, the client device can determine whether any of the content elements is not successfully displayed in the current format. The client device can determine whether any of the content elements of the information resource 212 to be rendered do not have a corresponding node in the rendering tree generated by the application. The client device can identify the content elements of the information resource. The client device can identify or access the rendering tree generated by the application. The client device can traverse the rendering tree. While traversing the rendering tree, for each content elements of the information resource, the client device can identify that none of the nodes in the rendering tree correspond to the respective content elements.

The application can determine whether any additional nodes are added to the rendering tree. While traversing the rendering tree, for each content elements of the information resource, the client device can identify that at least one of the nodes of the rendering tree does not correspond to any of the content elements of the information resource. In some implementations, the application can identify that the additional node in the rendering tree is an overlay over another node corresponding to one of the content elements of the information resource. For example, the application can identify two nodes of the rendering tree with a coordinate position similar (e.g., within 10%) to each other based on the respective rendering properties. The application can identify the size and z-index for each of these two nodes from the respective rendering properties. Upon determining that the sizes specified in the rendering properties for the two nodes is similar (e.g., within 10%) and that the z-index of the additional node is higher than the node corresponding to one of the content elements, the application can determine that the additional node of the rendering tree is an overlay over another node corresponding to one of the content elements.

The application can determine whether the rendering tree is altered. In some implementations, the application can identify the rendering properties for each of the nodes in the rendering tree. In some implementations, the application can identify the format and attribute for each of the content elements specified in the information resource. In some implementations, the application can identify the style rule for each of the content elements specified in the information resource. While traversing the rendering tree, for each content elements of the information resource, the application can identify a corresponding node of the rendering tree and one or more rendering properties for the respective node. The application can compare the one or more rendering properties for the corresponding node to the properties or attributes of the respective content elements of the information resource. Based on the comparison, the application can determine that the one or more rendering properties for the corresponding node for the respective content elements are altered.

In the context of layouts, the interrupter module can change, modify, or otherwise alter the layout generated by the application. The interrupter module can select one of the sub-layouts (such as the one corresponding to the first content element) based on various attributes of the respective sub-layout to change, modify, or remove the selected sub-layout. For example, based on the absolute pixel positions of each sub-layout, the interrupter module can identify one sub-layout that is to be rendered generally along the top of the information resource. Upon identified the sub-layout to be rendered generally along the top of the information resource, the interrupter module can insert an overlay sub-layout into the layout such that the newly inserted overlay layout occludes the selected sub-layout.

Using the layout generated by the application, the client device can determine whether any of the content elements is not successfully displayed in the current format. The client device can determine whether any of the content elements of the information resource to be rendered do not have a corresponding sub-layout in the layout generated by the application. The client device can identify the content elements of the information resource that is to be rendered. The client device can identify or access the layout generated by the application. The client device can traverse the layout. While traversing the layout, for each of the content elements of the information resource, the client device can identify that none of the sub-layouts in the layout correspond to the respective content elements.

The client device can determine whether any additional sub-layouts are added to the layout. For example, the interrupter module may insert an overlay sub-layout into the layout such that the newly inserted overly layout occludes another sub-layout, such as by having a higher z-index. In some implementations, the client device can calculate a number of content elements of the information resource to be rendered. The client device can identify a number of sub-layouts in the layout generated from the rendering tree. The client device can compare the number of content elements to be rendered to the number of sub-layouts. If the number of sub layouts is greater than the number of content elements by a predetermined threshold, the application can determine that there are one or more additional sub-layouts. In some implementations, the client device can identify that the additional sub-layout is an overlay over another sub-layout. For example, the application can identify two sub-layouts of the layout with a coordinate position similar (e.g., within 10%) to each other based on the respective rendering information. The client device can identify the size and z-index for each of these two sub-layouts from the respective rendering information. Upon determining that the sizes specified in the rendering properties for the two sub-layouts is similar (e.g., within 10%) and that the z-index of the additional sub-layout is higher than the sub-layout corresponding to one of the content elements, the client device can determine that the additional sub-layout of the layout is an overlay over another sub-layout corresponding to one of the content elements.

The client device can determine whether the layout generated by the application is altered. In some implementations, the client device can identify the format and attribute for each of the content elements specified in the information resource. In some implementations, the client device can identify the style rule for each of the content elements specified in the information resource. In some implementations, the client device can access the properties or attributes for each content object of the document tree. In some implementations, the client device can access the properties or attributes in the matched style rule for each of the content objects of the object model. While traversing the layout, for each content elements of the information resource, the client device can identify a corresponding sub-layout and the rendering information for the sub-layout. The client device can compare the one or more rendering properties for the corresponding node to the properties or attributes of the respective content elements of the information resource or the properties or attributes of the respective style rule. Based on the comparison, the client device can determine that the one or more rendering information for the corresponding sub-layout of the layout for the respective content elements is altered.

The client device can, responsive to determining that the first content element is not successfully displayed in the first format, render the first content element for display on the information resource in a second format (BLOCK 412). The client device can modify the first content element from first format to the second format. The second format can specify different visual characteristics for the respective content elements, such as color, font, font size, font type, size, and position, among others. In some implementations, the client device can modify the first content element by including the second format. In some implementations, the client device can select the second format based on the prioritization order specified in the respective content elements or the information resource.

The client device can maintain a counter for an attempt count indicating a number of attempts to display the first content element on the information resource. Responsive to determining that the first content element is not successfully displayed in one format, the client device can increment the attempt count. Each time the attempt count is incremented, the client device can modify the first content element from first format to the second format. In some implementations, the client device can determine whether the attempt count is above or below the predetermined threshold. If the attempt count is below the predetermined threshold, the client device can continue modifying the first content element using the second format. If the attempt count is above or equal to the predetermined threshold, the client device can terminate, cease, or stop all functionalities of the content render verification script. In some implementations, if the attempt count is above or equal to the predetermined threshold, the client device can terminate, cease, or stop the display of additional content elements.

Responsive to determining that the first content element is successfully displayed in any format, the client device can transmit a positive pingback indicating successful rendering of the first content element on the information resource. The positive pingback can include a content element identifier corresponding to the content elements that succeeded in being displayed on the information resource, format identifiers corresponding to the respective subset of formats of the content elements that did not succeed or failed to be displayed on the information resource, format identifiers corresponding to the respective format of the content element that succeeded in being displayed on the information resource, a device identifier corresponding to the client device and an application profile corresponding to an application type of the application. Receipt of the positive pingback can cause the data processing system to update the database.

The client device can determine that the first content element is successfully displayed in the second format (BLOCK 415). Using the document tree generated by the application, the client device can determine whether any of the content elements is successfully displayed in the second format. The client device can determine whether every content elements of the information resource to be rendered has a corresponding content object in the document tree generated by the application. The client device can traverse the document tree generated by the application. While traversing the document tree, for each content elements of the information resource, the client device can identify that every content elements corresponds to the respective content object of the document tree. The client device can determine that the document tree has a correct number of content objects. The correct number of content objects may correspond to the number of content elements to be rendered. The client device can identify the length, cardinality, or number of content objects of the document tree and compare to the number of content elements of the information resource to be rendered. Based on the comparison, the client device can determine that the document tree has a correct number of content objects The client device can determine whether the document tree is altered. In some implementations, the client device can identify the attribute or property of each of the content objects of the document tree. In some implementations, the client device can identify the format and attributes for each of the content elements. While traversing the document tree, for each content elements of the information resource, the client device can identify a corresponding content object of the document tree. The client device can compare the attribute or property of the corresponding content object of the document tree to the attribute or property of the respective content elements of the information resource to determine whether there is a match or an equivalent mapping. If there is at least one content object that does not match or have an equivalent mapping to the corresponding content elements, the client device can determine that the corresponding content object of the document tree for the respective content elements of the information resource is altered. If all content objects that match or have an equivalent mapping to the corresponding content elements, the client device can determine that the corresponding content object of the document tree for the respective content elements of the information resource is unaltered.

Using the object model generated by the application, the client device can determine whether any of the content elements is successfully displayed in the second format. The client device can determine that the object model has a correct number of content objects. The correct number of content objects may correspond to the number of content elements to be rendered. The client device can determine whether every content elements of the information resource to be rendered has a corresponding content object in the object model. The client device can traverse the object model. While traversing the object model, for each content elements of the information resource, the client device can identify that none of the content objects of the object model correspond to the respective content elements. The client device can identify the length, cardinality, or number of content objects of the object model and compare to the number of content elements of the information resource to be rendered. If the number of content objects matches the number of content elements to be rendered, the client device can determine that the object model has a correct number of content objects.

The client device can determine whether the object model is altered. In some implementations, the client device can determine whether any of the matched style rules of the object model is altered. In some implementations, the client device can identify the attribute or property of each of the style rules matched to the respective content object of the object model. In some implementations, the client device can identify the format and attribute for each of the content elements from the information resource. In some implementations, the client device can identify the style rule for each of the content elements specified in the information resource. While traversing the object model, for each content elements of the information resource, the client device can identify a corresponding content object of the object model and identify a corresponding matched style rule. The client device can compare the attribute or property of the corresponding style rule of the corresponding content object of the object model to the attribute or property of the respective content elements of the information resource to determine whether there is a match or an equivalent mapping. If there is at least one of the corresponding style rules of the corresponding content object does not match or have an equivalent mapping to the corresponding content elements, the client device can determine that the corresponding content object of the object model for the respective content elements of the information resource is altered. If all of the corresponding style rules of the corresponding content object match or have an equivalent mapping to the corresponding content elements, the client device can determine that the corresponding content object of the document tree for the respective content elements of the information resource is unaltered.

Using the rendering tree generated by the application, the client device can determine whether any of the content elements is successfully displayed in the second format. The client device can determine whether every content elements of the information to be rendered has a corresponding node in the rendering tree generated by the application. The client device can traverse the rendering tree generated by the application. While traversing the rendering tree, for each content elements of the information resource, the client device can identify that every content elements corresponds to the respective node in the rendering tree. The client device can determine that the rendering tree has a correct number of content objects. The correct number of nodes may correspond to the number of content elements to be rendered. The client device can identify the length, cardinality, or number of nodes of the rendering tree and compare to the number of content elements of the information resource to be rendered. If the number of content objects matches the number of content elements to be rendered, the client device can determine that the rendering tree has a correct number of nodes.

The client device can determine whether the rendering tree is altered. In some implementations, the client device can identify the rendering properties for each of the nodes in the rendering tree. In some implementations, the client device can identify the format and attribute for each of the content elements specified in the information resource. In some implementations, the client device can identify the style rule for each of the content elements specified in the information resource. While traversing the rendering tree, for each content elements of the information resource, the client device can identify a corresponding node of the rendering tree and one or more rendering properties for the respective node. The client device can compare the one or more rendering properties for the corresponding node to the properties or attributes of the respective content elements of the information resource. If there is at least one node that does not match or have an equivalent mapping to the properties or attributes of the corresponding content elements, the client device can determine that the corresponding node of the rendering tree for the respective content elements of the information resource is altered. If all the nodes of the rendering tree that match or have an equivalent mapping to the properties or attributes of the corresponding content elements, the client device can determine that the corresponding node of the rendering tree for the respective content elements of the information resource is unaltered.

Using the layout generated by the application, the client device can determine whether any of the content elements is successfully displayed in the second format. The client device can determine whether every content elements of the information to be rendered has a corresponding sub-layout in the layout. The client device can traverse the layout generated by the application. While traversing the layout, for each content elements of the information resource, the client device can identify that every content elements corresponds to the respective sub-layout in the rendering tree. The client device can determine that the layout has a correct number of content objects. The correct number of sub-layouts may correspond to the number of content elements to be rendered. The client device can identify the length, cardinality, or number of sub-layout of the layout and compare to the number of content elements of the information resource to be rendered. If the number of sub-layouts of the layout matches the number of content elements to be rendered, the client device can determine that the layout has a correct number of sub-layouts.

The client device can determine whether the layout generated by the application is altered. In some implementations, the client device can identify the format and attribute for each of the content elements specified in the information resource. In some implementations, the client device can identify the style rule for each of the content elements specified in the information resource. In some implementations, the client device can access the properties or attributes for each content object of the document tree. In some implementations, the client device can access the properties or attributes in the matched style rule for each of the content objects of the object model. While traversing the layout, for each content elements of the information resource, the client device can identify a corresponding sub-layout and the rendering information for the sub-layout. The client device can compare the one or more rendering properties for the corresponding node to the properties or attributes of the respective content elements of the information resource or the properties or attributes of the respective style rule. If there is at least one sub-layout that does not match or have an equivalent mapping to the properties or attributes of the corresponding content elements, the client device can determine that the corresponding sub-layout of the layout for the respective content elements of the information resource is altered. If all the sub-layout of the layout that match or have an equivalent mapping to the properties or attributes of the corresponding content elements, the client device can determine that the corresponding sub-layout of the layout for the respective content elements of the information resource is unaltered.

The client device can display a second content element of the information resource, responsive to determining that first content element is successfully displayed in the second format (BLOCK 418). Responsive to determining that the first content element is successfully displayed in the second format, the application can display additional or other content elements of the information resource. In some implementations, the application can determine whether the additional content element is received from the data processing system, content provider computing devices, or content publisher computing devices. If the application determines that the second content element was not received, the application can transmit a request for additional content to the data processing system, content provider computing devices, or content publisher computing devices. The application can subsequently receive the second content element from the data processing system, content provider computing devices, or content publisher computing devices. If the application determines that the additional content element was received, the application can retrieve or access the additional content element from the local memory or cache of the client device. The application can cause the application to process the second content element and the client device to render and display the second content element.

When the request for additional content, positive pingback, or negative pingback is transmitted by the client device and is received by the data processing system, the data processing system can update the database based on the request for additional content, positive pingback, or negative pingback. The database can include one or more entries. Each of the entries can include list or set of accepted format identifiers and content elements identifiers corresponding to formats and content elements successfully or unsuccessfully displayed by the respective client device arranged by client identifier and an application profile.

In some implementations, responsive to receiving the request for additional content or the request for content from the client device, the data processing system can identify the device identifier and the application profile from the request. The data processing system can access the database to identify the device identifier and the application profile from the one or more entries maintained on the database. From the one or more entries maintained on the database, the data processing system can select the first content element and the respective formats based the device identifier and the application profile. In some implementations, the data processing system can identify the format identifiers and the content element identifiers from the one or more entries maintained on the database using the device identifier and the application profile to select formats and content elements that were previously successfully displayed on the client device.

In some implementations, the application can calculate, for each format of each of the first content element, a likelihood of success that the respective content element in the respective format will be rendered or displayed by the client device based on the device identifier and the application profile. In some implementations, the application can identify a number of successes and number of failures for the application profile across a plurality of device identifiers from the one or more entries maintained in the database. The application can calculate the likelihood of success that the respective content element in the respective format will be rendered or displayed based on the number of successes and the number of failures. The application can determine the prioritization order based on the likelihood of success for each of the formats for each of the first content element of the information resource.

The data processing system can transmit the first content element and the respective formats to client device. The data processing system can subsequently receive a positive pingback or negative pingback from the client device. Based on receiving the positive pingback or negative pingback, the data processing system can determine whether client device successfully rendered or displayed the first content element and the respective formats to the client device.

If the data processing system determines that the client device did not successfully render or display first content element and the respective formats (e.g., received a negative pingback), the data processing system can update the one or more entries maintained by the database to include an indication of failure, the content element identifiers, and the format identifiers corresponding to the content elements and the formats that were not successfully rendered by the client device. The data processing system can maintain a counter for attempt counts indicating a number of attempts of transmitting the one or more formats for each of first content element on the information resource to the client device. The data processing system can subsequently determine whether the attempt count is below or above a predetermined threshold. The predetermined threshold can indicate or represent the number of transmissions of various formats and content elements that the data processing system permits prior to termination of communications with the client device. If the attempt count is below the predetermined threshold, the data processing system can select one or more second formats for each of one or more other content elements to transmit to the client device. If the attempt count is above the predetermined threshold, the data processing system, in conjunction with the one or more other modules of the data processing system, can termination communications between the data processing system and the data processing system.

Responsive to determining that the first content element is not successfully displayed in one format, the client device can increment the attempt count. Each time the attempt count is incremented, the client device can modify the first content element from first format to the second format. In some implementations, the client device can determine whether the attempt count is above or below the predetermined threshold. If the attempt count is below the predetermined threshold, the client device can continue modifying the first content element using second format. If the attempt count is above or equal to the predetermined threshold, the client device can terminate, cease, or stop all functionalities of the content render verification script. In some implementations, if the attempt count is above or equal to the predetermined threshold, the client device can terminate, cease, or stop the display of additional content elements (such as the second content element).

If the data processing system determines that the client device successfully rendered or displayed first content element and the respective formats (e.g., received a positive pingback), the data processing system can update the one or more entries maintained by the database to include an indication of success the content element identifiers, and the format identifiers corresponding to the content elements and the formats that were successfully rendered by the client device. In some implementations, the data processing system can select additional content elements based on the updated entries of the database and transmit the selected additional content elements to the client device. In some implementations, selection of the formats for the additional content elements and the content elements based on the updated entries of the database may increase a likelihood that the client device will successfully render the additional content elements. For example, the database may indicate that the fifth format of a content element previously lead to a successful rendering on the client device. In subsequent requests for content from the client device, the data processing system can select the fifth format for the content element as the first format to be processed by the client device.

Figure 5:
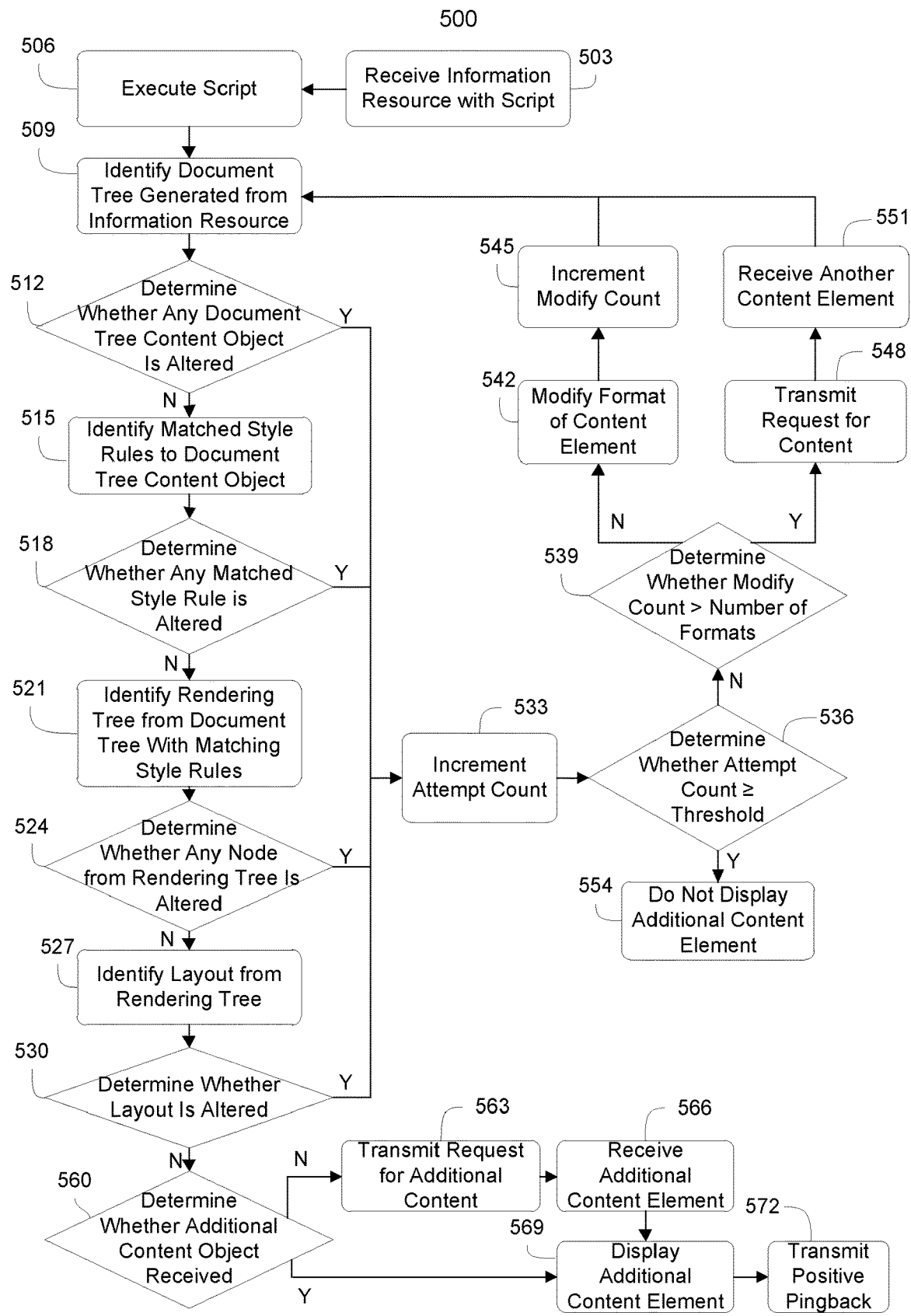
FIG. 5 is a flow diagram depicting a method of deploying countermeasures against unauthorized scripts interfering with the rendering of content elements on information resources, according to an illustrative implementation.

FIG. 5 is a flow diagram depicting a method 500 of deploying countermeasures against unauthorized scripts interfering with the rendering of content elements on information resources, according to an illustrative implementation. The functionality described herein with respect to method 400 can be performed or otherwise executed by the data processing system 110 or client device 125 as shown in FIG. 1, the content display management system 200 as shown in FIG. 2, or a computing device as shown in FIG. 7, or any combination thereof. In brief overview, a client device can receive an information resource with a content render verification script (BLOCK 503). The client device can execute the content render verification script (BLOCK 506). The client device can identify a document tree generated by an application running on the client device based the information resource (BLOCK 509). The client device can determine whether any document tree content object is altered (BLOCK 512). If there are no alterations, the client device can identify an object model matching style rules to the document tree content objects (BLOCK 515). The client device can determine whether any of the matched style rules on the object model are altered (BLOCK 518). If there are no alterations, the client device can identify a rendering tree generated by the application from the object model (BLOCK 521). The client device can determine whether any node of the rendering tree is altered (BLOCK 527). If there are no alterations, the client device can identify a layout generated by the application from the rendering tree (BLOCK 530).

If there are any alterations to the document tree, the object model, the rendering tree, or the layout, the client device can increment an attempt count (BLOCK 533). The client device can determine whether the attempt count is greater than or equal to a threshold (BLOCK 536). If the attempt count is less than the threshold, the client device can determine whether the modify count is greater than to a number of formats for the respective content element (BLOCK 539). If the modify count is less than or equal to the number of formats, the client device can modify the format of the content element (BLOCK 542). The client device can increment the modify count (BLOCK 545). If the modify count is greater than the number of formats, the client device can transmit a request for content to an external server (e.g., data processing system) (BLOCK 548). The client device can subsequently receive another content element from the external server (BLOCK 551). If the attempt count is greater than or equal to the threshold, the client device may not display another content element (BLOCK 554).

If there are any alterations to the document tree, the object model, the rendering tree, and the layout, the client device can determine whether an additional content object is received (BLOCK 560). If no additional content was received, the client device can transmit a request for additional content to the external server (BLOCK 563). The client device can subsequently receive the additional content element (BLOCK 566). The client device can display the additional content element on the information resource (BLOCK 569). The client device can transmit a positive pingback indicating successful rendering and displaying of the content element of the information resource (BLOCK 572).

Figure 6:
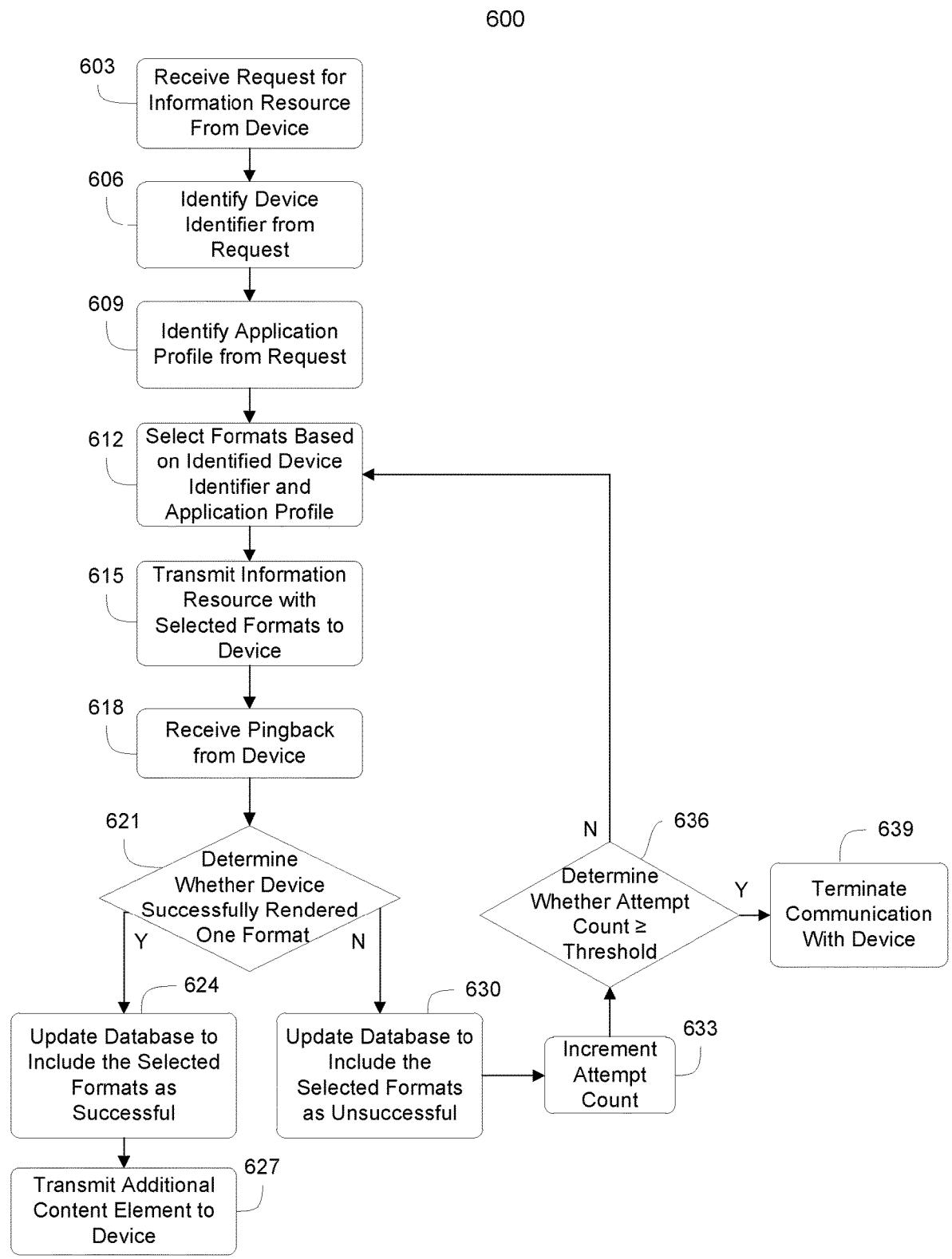
FIG. 6 is a flow diagram depicting a method of deploying countermeasures against unauthorized scripts interfering with the rendering of content elements on information resources, according to an illustrative implementation.

FIG. 6 is a flow diagram depicting a method 600 of deploying countermeasures against unauthorized scripts interfering with the rendering of content elements on information resources, according to an illustrative implementation. The functionality described herein with respect to method 600 can be performed or otherwise executed by the data processing system 110 or client device 125 as shown in FIG. 1, the content display management system 200 as shown in FIG. 2, or a computing device as shown in FIG. 7, or any combination thereof. The data processing system can receive a request for an information resource from a client device (BLOCK 603). The data processing system can identify a device identifier from the request (BLOCK 606). The data processing system can identify an application profile from the request (BLOCK 609). The data processing system can select formats for content elements on the information resource based on the identified device identifier and the application profile (BLOCK 612). The data processing system can transmit the information resource with the selected formats to the client device (BLOCK 615). The data processing system can subsequently receive a pingback from the client device (BLOCK 618). The data processing system can determine whether the client device successfully rendered at least one format of the selected formats for the content element (BLOCK 621). In some embodiments, the data processing system can determine that the client device did not successfully render the at least one format of the selected format for the content element, if the pingback is not received.

If the client device did not successfully rendered all the selected formats for the content element, the data processing system can update the database to include or indicate the selected formats were unsuccessful for the device identifier and the application profile (BLOCK 630). The data processing system can subsequently increment the attempt count (BLOCK 633). The data processing system can determine whether the attempt count is above a threshold (BLOCK 636). If the attempt count is greater than or equal to the threshold, the data processing system can terminate communications with the client device (BLOCK 639). If the attempt count is less than the threshold, the data processing system can select other formats and repeat the method 600 from BLOCK 612.

If the client device successfully rendered at least one of the formats for the content element, the data processing system can update the database to include or indicate that the selected formats were successful for the device identifier and the appliance profile (BLOCK 624). The data processing system can then transmit the additional content element to the client device (BLOCK 627).

FIG. 7 shows the general architecture of an illustrative computer system 700 that may be employed to implement any of the computer systems discussed herein (including the system 110 and its components such as the content request module 130, the content selection module 135, and script provider module 140 or content render verification system 200 and its modules including the application 205, the document tree generator 206, the rendering tree generator 208, the display module 210, the interrupter module 214, the content verification script 220, the document tree verification module 225, the rendering tree verification module 230, the content element retrieval module 235, and the element format modifier module 240) in accordance with some implementations. The computer system 700 can be used to provide information via the network 105 for display. The computer system 700 of FIG. 7 includes one or more processors 720 communicatively coupled to memory 725, one or more communications interfaces 705, and one or more output devices 710 (e.g., one or more display units) and one or more input devices 715. The processors 720 can be included in the data processing system 110 or the other components of the system 110 such as the content request module 130, the content selection module 135, and the script provider module 140 or in the client device 125 such as the application 205, the document tree generator 206, the rendering tree generator 208, the display module 210, the interrupter module 214, the content verification script 220, the document tree verification module 225, the rendering tree verification module 230, the content element retrieval module 235, and the element format modifier module 240, among others.

In the computer system 700 of FIG. 7, the memory 725 may include any computer-readable storage media, and may store computer instructions such as processor-executable instructions for implementing the various functionalities described herein for respective systems, as well as any data relating thereto, generated thereby, or received via the communications interface(s) or input device(s) (if present). Referring again to the system 110 of FIG. 1, the data processing system 110 can include the memory 725 to store information related to the availability of inventory of one or more content units, reservations of one or more content units, among others. In reference to the FIG. 2, the content render verification system 200 can include the memory 725 to store information resources, one or more content elements of the information resources, one or more formats of each content element, document trees, style rules, and render nodes generated using the information resource and data of the interrupter module, among others. The memory 725 can include the database 150. The processor(s) 720 shown in FIG. 7 may be used to execute instructions stored in the memory 725 and, in so doing, also may read from or write to the memory various information processed and or generated pursuant to execution of the instructions.

The processor 720 of the computer system 700 shown in FIG. 7 also may be communicatively coupled to or control the communications interface(s) 705 to transmit or receive various information pursuant to execution of instructions. For example, the communications interface(s) 705 may be coupled to a wired or wireless network, bus, or other communication means and may therefore allow the computer system 700 to transmit information to or receive information from other devices (e.g., other computer systems). While not shown explicitly in the system of FIG. 1 or 2A, one or more communications interfaces facilitate information flow between the components of the system 700. In some implementations, the communications interface(s) may be configured (e.g., via various hardware components or software components) to provide a website as an access portal to at least some aspects of the computer system 700. Examples of communications interfaces 705 include user interfaces (e.g., web pages), through which the user can communicate with the data processing system 110, content provider computing device 115, content publisher devices 120, or proxy device 155.

The output devices 710 of the computer system 700 shown in FIG. 7 may be provided, for example, to allow various information to be viewed or otherwise perceived in connection with execution of the instructions. The input device(s) 715 may be provided, for example, to allow a user to make manual adjustments, make selections, enter data, or interact in any of a variety of manners with the processor during execution of the instructions. Additional information relating to a general computer system architecture that may be employed for various systems discussed herein is provided further herein.

Implementations of the subject matter and the operations described in this specification can be implemented in digital electronic circuitry, or in computer software embodied on a tangible medium, firmware, or hardware, including the structures disclosed in this specification and their structural equivalents, or in combinations of one or more of them. Implementations of the subject matter described in this specification can be implemented as one or more computer programs, i.e., one or more modules of computer program instructions, encoded on computer storage medium for execution by, or to control the operation of, data processing apparatus. The program instructions can be encoded on an artificially-generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can include a source or destination of computer program instructions encoded in an artificially-generated propagated signal. The computer storage medium can also be, or be included in, one or more separate physical components or media (e.g., multiple CDs, disks, or other storage devices).

The features disclosed herein may be implemented on a smart television module (or connected television module, hybrid television module, etc.), which may include a processing module configured to integrate internet connectivity with more traditional television programming sources (e.g., received via cable, satellite, over-the-air, or other signals). The smart television module may be physically incorporated into a television set or may include a separate device such as a set-top box, Blu-ray or other digital media player, game console, hotel television system, and other companion device. A smart television module may be configured to allow viewers to search and find videos, movies, photos and other content on the web, on a local cable TV channel, on a satellite TV channel, or stored on a local hard drive. A set-top box (STB) or set-top unit (STU) may include an information appliance device that may contain a tuner and connect to a television set and an external source of signal, turning the signal into content which is then displayed on the television screen or other display device. A smart television module may be configured to provide a home screen or top level screen including icons for a plurality of different applications, such as a web browser and a plurality of streaming media services, a connected cable or satellite media source, other web "channels", etc. The smart television module may further be configured to provide an electronic programming guide to the user. A companion application to the smart television module may be operable on a mobile computing device to provide additional information about available programs to a user, to allow the user to control the smart television module, etc. In alternate implementations, the features may be implemented on a laptop computer or other personal computer, a smartphone, other mobile phone, handheld computer, a tablet PC, or other computing device.

The operations described in this specification can be implemented as operations performed by a data processing apparatus on data stored on one or more computer-readable storage devices or received from other sources.

The terms "data processing apparatus", "data processing system", "user device" or "computing device" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures. The content request module 130, the content selection module 135, the script provider module 140, or format prioritization module 150 can include or share one or more data processing apparatuses, computing devices, or processors. The application 205, the document tree generator 206, the rendering tree generator 208, the display module 210, the interrupter module 214, the content verification script 220, the document tree verification module 225, the rendering tree verification module 230, the content element retrieval module 235, and the element format modifier module 240 can include one or more data processing apparatuses, computing devices, or processors.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatuses can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), for example. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube), plasma, or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can include any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an internetwork (e.g., the Internet), and peer-to-peer networks (e.g., ad hoc peer-to-peer networks).

The computing system such as system 700 or system 110 can include clients and servers. For example, the data processing system 110 can include one or more servers in one or more data centers or server farms. A client and server are generally remote from each other and typically interact through a communication network. The relationship of client and server arises by virtue of computer programs running on the respective computers and having a client-server relationship to each other. In some implementations, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of any inventions or of what may be claimed, but rather as descriptions of features specific to particular implementations of the systems and methods described herein. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In some cases, the actions recited in the claims can be performed in a different order and still achieve desirable results. In addition, the processes depicted in the accompanying figures do not necessarily require the particular order shown, or sequential order, to achieve desirable results.

In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products. For example, the content request module 130, the content selection module 135, and the script provider module 140 can be part of the data processing system 110, a single module, a logic device having one or more processing modules, one or more servers, or part of a search engine. In addition, the application 205, the document tree generator 206, the rendering tree generator 208, the display module 210, the interrupter module 214, the content verification script 220, the document tree verification module 225, the rendering tree verification module 230, the content element retrieval module 235, and the element format modifier module 240 can be part of the client device 125, a single module, or a logic device having one or more processing module.

Having now described some illustrative implementations and implementations, it is apparent that the foregoing is illustrative and not limiting, having been presented by way of example. In particular, although many of the examples presented herein involve specific combinations of method acts or system elements, those acts and those elements may be combined in other ways to accomplish the same objectives. Acts, elements and features discussed only in connection with one implementation are not intended to be excluded from a similar role in other implementations or implementations.

The phraseology and terminology used herein is for the purpose of description and should not be regarded as limiting. The use of "including" "comprising" "having" "containing" "involving" "characterized by" "characterized in that" and variations thereof herein, is meant to encompass the items listed thereafter, equivalents thereof, and additional items, as well as alternate implementations consisting of the items listed thereafter exclusively. In one implementation, the systems and methods described herein consist of one, each combination of more than one, or all of the described elements, acts, or components.

Any references to implementations or elements or acts of the systems and methods herein referred to in the singular may also embrace implementations including a plurality of these elements, and any references in plural to any implementation or element or act herein may also embrace implementations including only a single element. References in the singular or plural form are not intended to limit the presently disclosed systems or methods, their components, acts, or elements to single or plural configurations. References to any act or element being based on any information, act or element may include implementations where the act or element is based at least in part on any information, act, or element.

Any implementation disclosed herein may be combined with any other implementation, and references to "an implementation," "some implementations," "an alternate implementation," "various implementation," "one implementation" or the like are not necessarily mutually exclusive and are intended to indicate that a particular feature, structure, or characteristic described in connection with the implementation may be included in at least one implementation. Such terms as used herein are not necessarily all referring to the same implementation. Any implementation may be combined with any other implementation, inclusively or exclusively, in any manner consistent with the aspects and implementations disclosed herein.

References to "or" may be construed as inclusive so that any terms described using "or" may indicate any of a single, more than one, and all of the described terms.

Where technical features in the drawings, detailed description or any claim are followed by reference signs, the reference signs have been included for the sole purpose of increasing the intelligibility of the drawings, detailed description, and claims. Accordingly, neither the reference signs nor their absence have any limiting effect on the scope of any claim elements.

The systems and methods described herein may be embodied in other specific forms without departing from the characteristics thereof. Although the examples provided herein relate to attributing a scroll event on an application, the systems and methods described herein can include applied to other environments. The foregoing implementations are illustrative rather than limiting of the described systems and methods. Scope of the systems and methods described herein is thus indicated by the appended claims, rather than the foregoing description, and changes that come within the meaning and range of equivalency of the claims are embraced therein.

What is claimed is:

1. A method of preventing interference with the rendering of content elements on information resources, comprising:
receiving, by a client device from a data processing system, an information resource including a content rendering verification script and a first content element, the content rendering verification script including computer-executable instructions to cause the client device to:
execute instructions to render the first content element for display on the information resource in a first format of a plurality of formats for the first content element, each of the plurality of formats defining a corresponding set of graphical properties for rendering the first content element;
determine that the first content element is not successfully displayed in accordance with a first set of graphical properties of the first format;
responsive to determining that the first content element is not successfully displayed in the first format, select a second format from the plurality of formats, the second format having a second set of graphical properties different from the first of graphical properties of the first format to modify displaying of the first content element;
execute, responsive to a number of attempts at presenting the first content element being less than a threshold number, instructions to render the first content element for display on the information resource in the second format selected from the plurality of formats; and
terminate, responsive to the number of attempts at presenting the first content element being greater than or equal to the threshold number, execution of instructions to render the first content element for display on the information resource in the plurality of formats.

2. The method of claim 1, wherein the content rendering verification script includes computer-executable instructions to cause the client device to prevent display of a second content item responsive to determining that the first content element is not successfully displayed in the first format.

3. The method of claim 1, wherein rendering the first content element for display on the information resource further comprises identifying a rendering tree for rendering the information resource, the rendering tree including one or more nodes; and
wherein determining that the first content element is not successfully displayed in the first format further comprises determining that any of the one or more nodes of the rendering tree does not correspond to the first content element.

4. The method of claim 1, wherein rendering the first content element for display on the information resource further comprises identifying a rendering tree for rendering the information resource, the rendering tree including one or more nodes; and
wherein determining that the first content element is not successfully displayed in the first format further comprises determining that the second content element is displayed as an overlay over the first content element.

5. The method of claim 1, wherein rendering the first content element for display on the information resource further comprises identifying a document tree generated from the information resource, the document tree including a plurality of content objects; and
wherein determining that the first content element is not successfully displayed in the first format further comprises determining that at least one content object of the document tree is altered.

6. The method of claim 1, wherein rendering the first content element for display on the information resource further comprises identifying an object model generated based on the information resource, the object model including a plurality of content objects, each content object including a corresponding style rule; and
wherein determining that the first content element is not successfully displayed in the first format further comprises determining that at least one style rule of the object model is altered.

7. The method of claim 1, wherein rendering the first content element for display on the information resource in the second format further comprises modifying the first content element by including the second format, the second format specifying different graphical characteristics for the first content element from the first format.

8. The method of claim 1, wherein receiving the information resource further comprises receiving the information resource including the first content element, the first content element including the plurality of formats; and
wherein the script includes computer-executable instructions to cause the client device to successively render the first content element in successive ones of the plurality of formats responsive to determining that the first content element is not successfully displayed in an immediately previous one of the plurality of formats in which the first content element was rendered.

9. The method of claim 1, wherein receiving the information resource further comprises receiving the information resource including the first content element, the first content element including the plurality of formats and a prioritization order specifying a selection sequence of the plurality of formats for processing by the client device; and
wherein rendering the first content element for display on the information resource in the second format further comprises selecting, from the plurality of formats included in the first content element, the second format subsequent to the first format based on the prioritization order.

10. The method of claim 1, wherein the content rendering verification script further causes the client device to:
maintain a counter indicating the number of attempts to present the first content element on the information resource;
increment, responsive to determining that the first content element in the first format is not successfully displayed on the information resource, the counter indicating the number of attempts; and
determine that the counter indicating the number of attempts is below the threshold number.

11. The method of claim 1, wherein determining that the first content element is successfully displayed in the second format further comprises transmitting, responsive to determining that the first content element is successfully displayed in the second format, to the data processing system, a pingback indicating successful rendering of the first content element on the information resource, the pingback including a device identifier of the client device and a format identifier of the second format.

12. The method of claim 11, wherein receipt of the pingback causes the data processing system to update a database maintained by the data processing system based on the device identifier and the format identifier, the database including a plurality of entries identifying for each device identifier a set of accepted format identifiers corresponding to formats successfully displayed.

13. The method of claim 1, further comprising:
transmitting, by the client device, to the data processing system, a request for content, the request including a device identifier and an application profile, receipt of the request causing the data processing system to:
select the first content element including the plurality of formats;
calculate, for each of the plurality of formats, a likelihood of success that the first content element in the respective format will be displayed on the information resource based on the device identifier and the application profile; and
determine a prioritization order specifying a selection sequence of the plurality of formats for processing by the client device based on the likelihood of success for each of the plurality of formats.

14. A system for preventing interference with the rendering of content elements on information resources, comprising:
a client device having one or more processors and at least one memory storing computer readable instructions configured to receive, from a data processing system, an information resource including a content rendering verification script and a first content element, the content rendering verification script including computer-executable instructions to cause the client device to:
execute instructions to render the first content element for display on the information resource in a first format of a plurality of formats for the first content element, each of the plurality of formats defining a corresponding set of graphical properties for rendering the first content element;
determine that the first content element is not successfully displayed in accordance with a first set of graphical properties of the first format;
responsive to determining that the first content element is not successfully displayed in the first format, select a second format from the plurality of formats, the second format having a second set of graphical properties different from the first of graphical properties of the first format to modify displaying of the first content element;
execute, responsive to a number of attempts at presenting the first content element being less than a threshold number, instructions to render the first content element for display on the information resource in a second format selected from the plurality of formats; and
terminate, responsive to the number of attempts at presenting the first content element being greater than or equal to the threshold number, execution of instructions to render the first content element for display on the information resource in the plurality of formats.

15. A non-transitory computer readable medium having computer-executable instructions that when executed causes one or more processors to:
receive, from a data processing system, an information resource including a content rendering verification script and a first content element, the content rendering verification script to cause the one or more processors to:
execute instructions to render the first content element for display on the information resource in a first format of a plurality of formats for the first content element, each of the plurality of formats defining a corresponding set of graphical properties for rendering the first content element;
determine that the first content element is not successfully displayed in accordance with a first set of graphical properties of the first format; and
responsive to determining that the first content element is not successfully displayed in the first format, select a second format from the plurality of formats, the second format having a second set of graphical properties different from the first of graphical properties of the first format to modify displaying of the first content element;
execute, responsive to a number of attempts at presenting the first content element being less than a threshold number, instructions to render the first content element for display on the information resource in a second format selected from the plurality of formats; and
terminate, responsive to the number of attempts at presenting the first content element being greater than or equal to the threshold number, execution of instructions to render the first content element for display on the information resource in the plurality of formats.

* * * * *